(12) United States Patent
French et al.

(10) Patent No.: US 10,674,734 B1
(45) Date of Patent: Jun. 9, 2020

(54) PIZZA OVEN AND A METHOD OF USING A PIZZA OVEN

(71) Applicants: Michael French, Vanderbilt, PA (US); Mark A. Bielstein, Connellsville, PA (US)

(72) Inventors: Michael French, Vanderbilt, PA (US); Mark A. Bielstein, Connellsville, PA (US)

(73) Assignee: MF&B RESTAURANT SYSTEMS, INC., Dunbar, PA (US)

( * ) Notice: Subject to any disclaimer, the term of this patent is extended or adjusted under 35 U.S.C. 154(b) by 0 days.

(21) Appl. No.: 16/540,380

(22) Filed: Aug. 14, 2019

Related U.S. Application Data

(63) Continuation of application No. 16/388,335, filed on Apr. 18, 2019.

(60) Provisional application No. 62/659,852, filed on Apr. 19, 2018.

(51) Int. Cl.
```
A21B 1/36      (2006.01)
A21B 1/48      (2006.01)
A21B 3/02      (2006.01)
A21D 13/41     (2017.01)
```
(52) U.S. Cl.
CPC .......... *A21B 1/36* (2013.01); *A21B 1/48* (2013.01); *A21B 3/02* (2013.01); *A21D 13/41* (2017.01)

(58) Field of Classification Search
CPC .............. A21B 1/36; A21B 1/48; A21D 13/41
USPC ........................ 99/443 C, 386; 219/388, 400
See application file for complete search history.

(56) References Cited

U.S. PATENT DOCUMENTS

| | | | |
|---|---|---|---|
| 6,085,738 A * | 7/2000 | Robinson | F23D 11/00 122/17.2 |
| 8,093,533 B2 * | 1/2012 | French | A21B 1/245 219/388 |
| 8,776,773 B1 * | 7/2014 | Wolfe | A21B 1/48 126/21 A |

* cited by examiner

*Primary Examiner* — Ibrahime A Abraham
*Assistant Examiner* — John J Norton
(74) *Attorney, Agent, or Firm* — Nils H. Ljungman & Associates

(57) ABSTRACT

A pizza oven and a method of using a pizza oven. The abstract of the disclosure is submitted herewith as required by 37 C.F.R. § 1.72(b). As stated in 37 C.F.R. § 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims. Therefore, any statements made relating to the abstract are not intended to limit the claims in any manner and should not a be interpreted as limiting the claims in any manner.

8 Claims, 36 Drawing Sheets

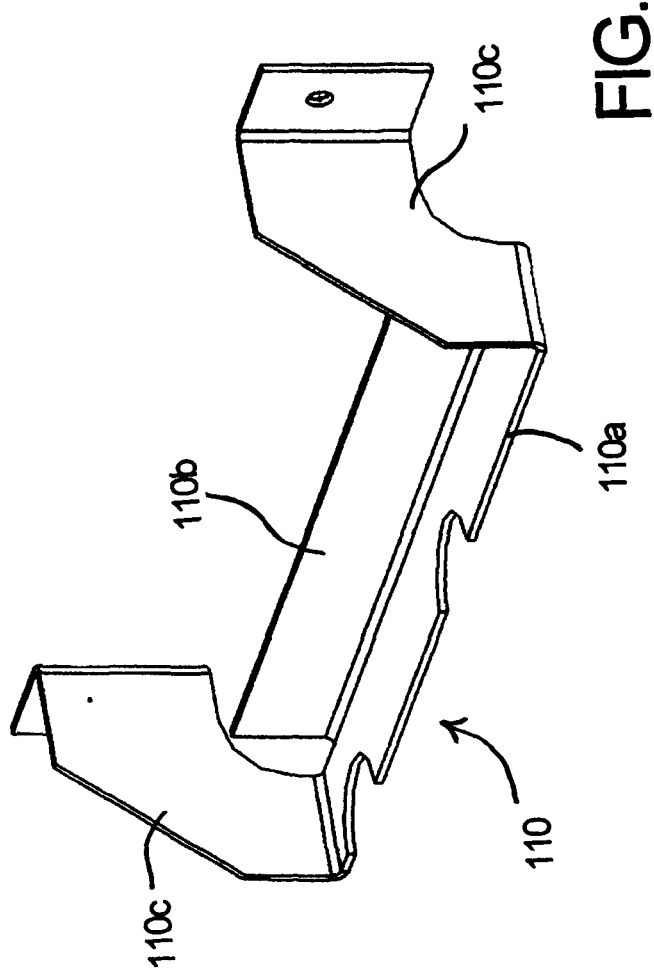

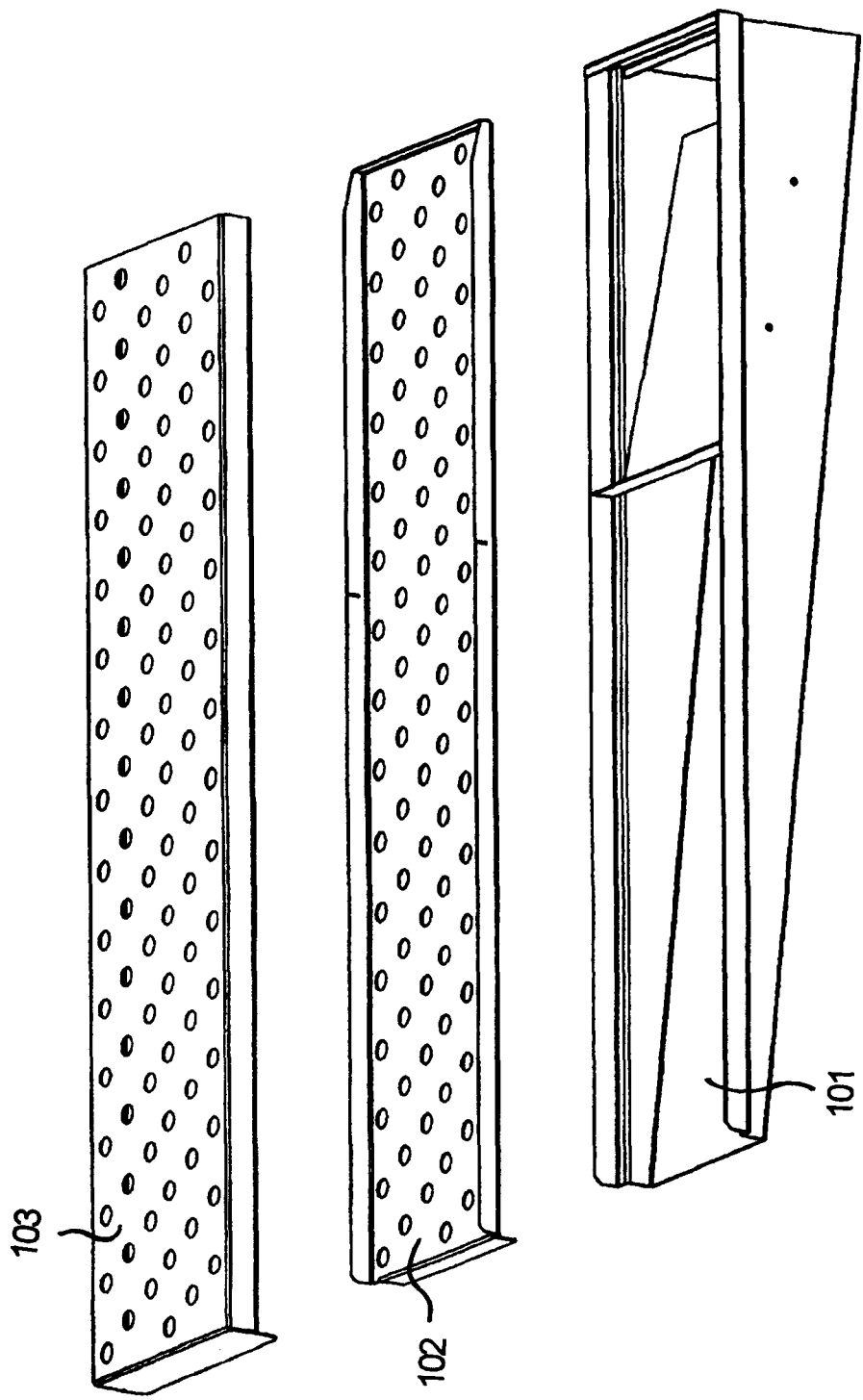

TOP VIEW

BACK VIEW

FRONT
VIEW

SIDE VIEW

TOP VIEW

BACK VIEW

FRONT VIEW

SIDE VIEW

TOP VIEW

BACK VIEW

FRONT VIEW

SIDE VIEW

TOP VIEW

BACK VIEW

FRONT VIEW

SIDE VIEW

TOP VIEW

BACK VIEW

FRONT VIEW

SIDE VIEW

TOP VIEW

BACK VIEW

FRONT VIEW

SIDE VIEW

PIZZA OVEN AND A METHOD OF USING A PIZZA OVEN

CONTINUING APPLICATION DATA

The present application is a continuation of U.S. application Ser. No. 16/388,335, filed Apr. 18, 2019, which claims the benefit of U.S. provisional patent application 62/659,852, filed Apr. 19, 2018.

CROSS REFERENCE TO RELATED APPLICATIONS

The present application is related to U.S. application Ser. No. 12/336,337, filed Dec. 16, 2008, now issued as U.S. Pat. No. 8,093,533, which is incorporated by reference herein, but is not admitted as prior art against the present application by its mention in this section.

BACKGROUND

1. Technical Field

The present application relates to a pizza oven and a method of using a pizza oven.

2. Background Information

Background information is for informational purposes only and does not necessarily admit that subsequently mentioned information and publications are prior art.

Pizza ovens are used to heat, cook, or bake foods, primarily pizza, but also any other foods that a restaurant or eatery wishes to serve, such as sandwiches. In general, most pizza shops and restaurants utilize conveyor-style pizza ovens. In these pizza ovens, at least one conveyor belt slowly moves a food product, such as a pizza, through an oven. In operation, the uncooked or unbaked pizza is placed onto the conveyor belt at one end of the oven. As the pizza travels through the oven, the heated air therein bakes the pizza. The pizza eventually exits the other end of the oven, where it can be picked up off of the conveyor belt and served to a consumer.

Such commercial, conveyor-style pizza ovens are usually constructed as a single unit and are then shipped to the customer. These units are extremely heavy, weighing approximately 1000 pounds, and are large and difficult to handle. Due to the large size and weight, the customer often must hire an installation service which specializes in moving and installing heavy machinery. Such installation can often be difficult and at times dangerous given the confined spaces in which pizza ovens are often installed, such as restaurants or pizza shops, and the bulky size and weight of the oven unit. As a result, there is a high cost of shipping to the customer, as well as the cost of installation.

Such pizza ovens are generally assembled by the manufacturer using riveting, tech screws, and welding, and thus are not easily disassembled. Thus, when repair of the pizza oven is necessary, either the entire pizza oven unit is sent to a repair center, a repair technician comes to the site where the unit is located, or the entire unit is replaced by a new unit. Each of these options has its disadvantages because of the costs involved, such as shipping costs, service call costs, or replacement costs, especially in the instance where only a minor repair is required. In addition, unless the owner of the pizza oven has a backup oven, there is also the cost in lost production time while awaiting the repair or replacement.

For breads and pastry-type products, such as pizza, even baking throughout the product is very important. Breads that are unevenly baked may have portions that are over-baked or burnt, or may have portions that are under-baked and doughy. Most consumers prefer that the bread have a slightly hardened or crusty exterior, but with a soft, fully-baked interior. However, achieving such results throughout the entire product can be difficult, especially if the bread is rather thick or, in the case of pizza, covered by layers of sauce, cheese, and toppings. In those situations, not only does the pizza crust need to be baked evenly, but also the cheese and toppings need to be baked evenly. Like the bread, the cheese and toppings can be undercooked such that the cheese is cold and unmelted and the toppings are raw, or can be overcooked such that cheese and toppings are burnt.

Hot air ovens are well known to produce uneven heating of products such as bread, primarily due to inconsistent or uneven air flow. Commercial pizza ovens can produce very uneven heating due to their relatively large size and volume that needs to be heated. As a result, uneven heating can occur such that a single pizza might have sections or portions baked to different levels, such as relatively under-baked sections to over-baked sections. Since consumers prefer, if not require, that all sections of a pizza or other bread product or pastry be baked or cooked the same, uneven baking or cooking should be minimized or avoided as much as possible. To achieve such even baking or cooking, the air flow system and heating devices can be monitored and controlled.

A common type of pizza oven is an air impingement oven. In these ovens, an air circulation system is used to guide and control the air movement within the oven. The air circulation system generally includes a main circulation motor and fan blade to generate air flow, air input openings and return openings, and air guide structures, such as finger components with a plurality of openings therein. These types of pizza ovens operate by flowing heated or hot air through input air ducts or hot air ducts located in a side wall of a baking chamber. In this manner, the hot air is conducted to the interior of the baking chamber where the products, such as pizzas, are located on the conveyor belt. The hot air heats the air and the structures and surfaces inside the baking chamber to in turn bake the food products. Return air ducts or cold air ducts are usually located in the same side wall of the baking chamber as the hot air ducts. Air is circulated between the return air ducts and the input air ducts through a plenum located behind the side wall. Ideally, the hot air diffuses or spreads throughout the baking chamber to achieve even heating temperatures in all areas of the baking chamber. Further, the hot air should be circulated as much as possible to conserve heat energy and reduce the need to heat the air. For example, the return air ducts not only draw in heated or hot air, they also draw in cooler air from the outside environment through the open ends of the baking chamber. It is therefore advantageous to minimize the amount of cooler air drawn in by the return air ducts, as such cooler air will lower the temperature of the air in the baking chamber and thus require additional and/or more frequent heating to maintain the desired baking temperature in the baking chamber.

To promote even baking by improved air flow, air impingement pizza ovens can utilize what are known as fingers or finger assemblies to direct heated air in a bake chamber toward a product to be baked. The fingers are elongated, generally rectangular, hollow, box-like structures which are enclosed and have a plurality of holes in one of the elongated sides through which heated air exits. The finger assembly is open on one end, which is placed over a corresponding hole in the oven plenum wall and is to be held tightly against the oven plenum wall portion surrounding the hole. Heated air is conducted through the hole in the plenum wall and into the finger, which air is then forced out of the holes in one of the elongated sides of the finger assembly toward the product being baked. The finger assemblies are often supported using angle rails or by a technique of sliding the fingers in along a front rail. This design does not maintain pressure against the finger assembly allowing the outer cover of the finger assembly to slide off the finger housing. When the outer cover is not properly in place on the finger housing the oven does not bake correctly. A large gap sometimes as large as 0.75 inches can be found in the rear of the finger assembly causing a loss of air pressure in the fingers and an uneven bake in the oven. Such designs have room for the housing to move, which allows leaking and loss of some pressure in the finger housing. The reason for leaving the finger housing loose is to allow for expansion and contraction during the heating process. Unfortunately, such movement of the finger housing may cause uneven airflow and pressure, which causes the oven to lose some of its baking efficiency.

Another way to promote even baking is to control the oven temperature to try to maintain a constant or relatively constant temperature when baking foods. In some conveyor pizza ovens, the main burner that provides heat is an on/off style burner. To further explain, this style of burner maintains the oven temperature by either being fully on at maximum output or fully off at no output. The problem with the on/off burner is that the temperature of the oven is not maintained close to the desired temperature. During heating up when the burner is turned on, the temperature of the oven can overheat by about ten or more degrees, possibly as much as between ten to twenty degrees or four to ten degrees, above the desired temperature before the oven stops heating. During cooling down when the burner is turned off, the temperature of the oven can cool about ten or more degrees, possibly as much as between ten to twenty degrees or four to ten degrees, below the desired temperature. For example, a pizza oven may be set to a desired baking temperature, such as five hundred degrees. When the pizza oven is turned on, the gas line is open and the burner operates at full power. When the temperature in the oven reaches the desired baking temperature, the oven control closes the gas line and thereby shuts down the burner. However, by the time the temperature in the oven is detected and the burner shut down, additional or residual heat is still output by the burner, which causes the oven to be heated beyond the desired baking temperature, such as to about five hundred and ten degrees or more. After shutdown, the oven loses temperature until the temperature in the oven reaches just below the desired baking temperature. At that point the control system opens up the gas line and ignites the flame. This re-lighting process takes additional time, and in that time the temperature in the oven will drop below the desired baking temperature, such as to about four hundred and ninety degrees or less. The burner goes through this shut down and restart cycle all day long in order to try and maintain the set point, that is, the desired baking temperature. The result is an oven with a total temperature swing in the range of up to twenty degrees or more, which can create uneven and inconsistent baking. Such a design is also very noisy due to the roar of the burner cycling on and off repeatedly. The advantage of the on/off style burner is that it is mechanically very simple, and thus relatively easy to repair and maintain.

In other conveyor pizza ovens, the main burner is a modulating burner that controls the gas flow or both the gas and air flows. This system is extremely accurate, but is much more complex than the on/off style burner. The start up of the modulating burner is similar to the on-off burner, in that the burner operates at full power to heat up the oven as quickly as possible. However, in contrast to the on/off system, the modulating burner slowly closes the main gas valve as the temperature of the oven approaches the desired baking temperature. In other words, instead of simply shutting off the valve when the desired temperature is detected, the modulating burner starts reducing the flow of gas before the desired baking temperature is achieved. Once the desired baking temperature is achieved, the control system monitors the temperature in the oven and either increases or decreases the gas flow to increase or decrease the heat output as needed. The modulating burner ideally will maintain the oven temperature within approximately one degree of the desired baking temperature, while burning less gas with less noise due to the burner not being shut on and off. However, the modulating burner requires a fairly complex control system and components, and thus is much more expensive and difficult to repair and maintain than the simpler on/off burner.

For conveyor pizza ovens that utilize natural gas, some sort of flame sense is required to verify proof of flame for safety reasons. To further explain, such pizza ovens feed a combustion gas to an ignition device, which ignites the flow of combustion gas into a flame for heating the air in the oven. The combustion gas is usually natural gas, but can be propane or gas produced from landfills. A flame detection device is used to detect whether or not the flame is ignited. If the flame is out for some reason, the flame sensor shuts off the flow of gas. Otherwise the gas would continue to flow directly into the oven and the surrounding work space, which could create a very dangerous situation in which the gas could build up in the oven and/or work space and ultimately explode if ignited. Currently, a flame detection arrangement is usually used to detect the flame. The flame detection arrangement includes two metal flame rods that are positioned to be in the path of the flame. The flame passes over the two flame rods, which causes the completion of an electrical circuit, which provides a signal that the flame is lit and actively burning the gas. However, the ability of such a flame detection arrangement can be hindered if the flame rods are damaged in some manner, such that the circuit is not made. For example, combustion gas created from landfills can contain siloxanes and/or other contaminants such as aldehyde. When the gas is combusted, the siloxane is converted into silica that deposits on nearby surfaces and structures. In a pizza oven using flame rods, the silica can deposit on the flame rods, and eventually can coat the flame rods such that the circuit cannot be completed reliably or at all. At that point, the flame detection arrangement will routinely signal that no flame is present and the gas supply will be shut off, even if the flame is actually lit, thereby interrupting the proper operation of the pizza oven. To address this problem, the current solution is to clean and/or replace the coated flame rods. In areas where landfill gas use is prevalent, cleaning and/or replacement of the flame rods must be done quite often, usually every few months. These interruptions and damage generate increased costs in delays and repairs.

It is not uncommon for objects relating to baking or making pizzas, such as a spatula or other cooking utensil, to accidentally become jammed in the conveyor belt. The conveyor belt will continue to run against this jam, thereby risking damage to the conveyor belt and possibly the conveyor motor if the jam is not detected by a worker and the conveyor motor shut down.

Most pizza ovens bake only at one air flow setting and one corresponding conveyor speed. Since the oven is on throughout a normal business day, the same amount of energy is utilized during slower business times when only a few products are being cooked or baked in a given amount of time as is used during faster or peak business times when several or many products are being cooked or baked in a given amount of time.

OBJECT OR OBJECTS

It is an object of the present application to provide a pizza oven that operates efficiently with decreased operating costs by utilizing at least one or more of the embodiments disclosed herein, either individually or in combination.

SUMMARY

In at least one exemplification, a pizza oven, such as a commercial pizza oven, has a conveyor arrangement that includes a conveyor belt. The conveyor belt is driven by a conveyor motor to move pizza and other food products thereon through an oven chamber, which generally includes a top wall, a bottom wall, and two side walls. The pizza is baked as it moves through the oven chamber on the conveyor. The chamber is open on both ends to permit the insertion of the uncooked pizza into the oven chamber on one side, and then the removal of the cooked pizza from the oven chamber at the other side.

The conveyor belt is supported on a rectangular frame designed to protrude out from the oven baking chamber at both the entrance and the exit openings. The rectangular frame is constructed to span the width of the baking chamber. The rectangular frame includes metal rods for support, structure retention, and belt guidance. A network of shafts, sprockets, and cogs are assembled within and without the rectangular frame to convey the belting and to aid in belt alignment. The shafts, cogs, and rods are covered in a continuous interlinking web of stainless-steel belting. The belting is of a chain design, allowing for direct contact with food products and of such dimensions that allow alignment and conveyance. A single conveyor belt can be made of one or two independent belts.

A jam detection device or system can be used to detect jams and automatically turn off the conveyor arrangement. In this manner, jams can be detected without the need for a worker to find them, so the conveyor belt can be reliably and automatically shut off before damage occurs.

To promote even baking or cooking of pizza and other food products in the pizza oven, the speed of the conveyor belt, the air circulation through the pizza oven, and/or the operation of a heating arrangement can be set, adjusted, and controlled in accordance with at least one possible exemplification disclosed herein. For safety purposes, the heating arrangement can be monitored using a flame detection arrangement in accordance with at least one possible exemplification disclosed herein.

The above-discussed exemplifications of the present invention will be described further hereinbelow. When the word "invention" or "exemplification of the invention" is used in this specification, the word "invention" or "exemplification of the invention" includes "inventions" or "exemplifications of the invention", that is the plural of "invention" or "exemplification of the invention". By stating "invention" or "exemplification of the invention", the Applicant does not in any way admit that the present application does not include more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

FIG. 5A shows a close-up view of the finger holder;

FIG. 6 shows at least one possible exemplification of a finger assembly;

DESCRIPTION OF EXEMPLIFICATION OR EXEMPLIFICATIONS

Figure 1:
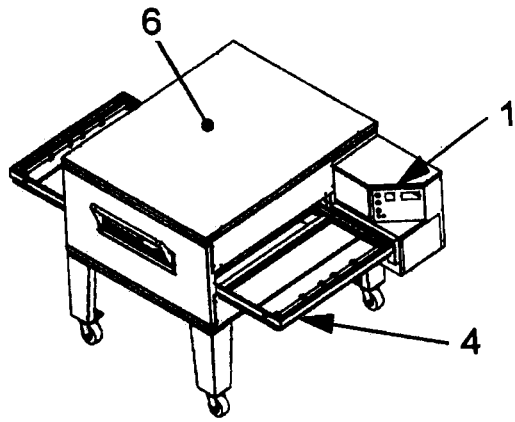
FIGS. 1-3 show at least one possible exemplification of a modular pizza oven.
Figure 2:
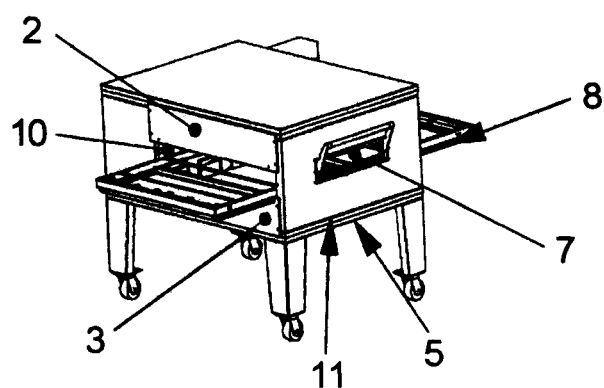
Figure 3:
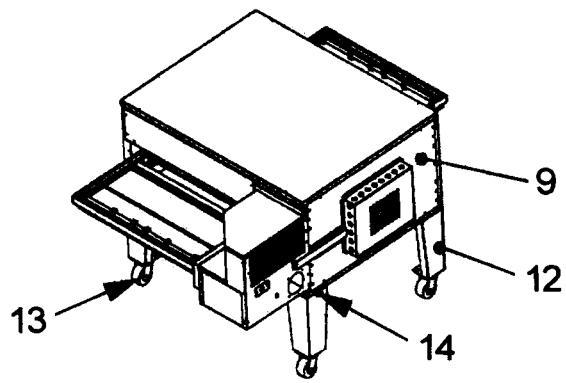

At least one possible exemplification of a modular pizza oven is shown in FIGS. 1-3. A control can assembly 1 houses the operating controls for the oven and the natural gas control devices and burner. An upper end plug 2 closes off the top half of the bake chamber above the conveyor belt. A lower end plug 3 closes off the bottom half of the bake chamber, below the conveyor belt. A conveyor belt 4 runs horizontally through the bake chamber and carries the product through the oven. An oven base 5 supports and insulates the bottom of the oven. An oven lid 6 mounts to the top of the oven, finishes off the oven stack and covers the oven insulation. A half-bake window 7 opens to allow a product to be placed halfway through the oven for half-bake time. A crumb pan 8 is located under both the entrance and exit of the conveyor belt and catches debris that falls through the conveyor belt. A back assembly 9 closes off the back of the bake chamber. A plenum assembly 10 houses the hot air blower motor and fan, as well as thermocouples to monitor hot air temperature. An oven bottom mounts to the top of the oven base, and is used to seal off the stack and cover the oven insulation. Oven legs 12 are used to raise or lower the oven to convenient working heights. Oven casters 13 are used on all oven configurations to allow moving the oven for installation and servicing. Restraining devices 14 secure the oven base to the wall to avoid damage to gas and electrical connections.

Figure 4:
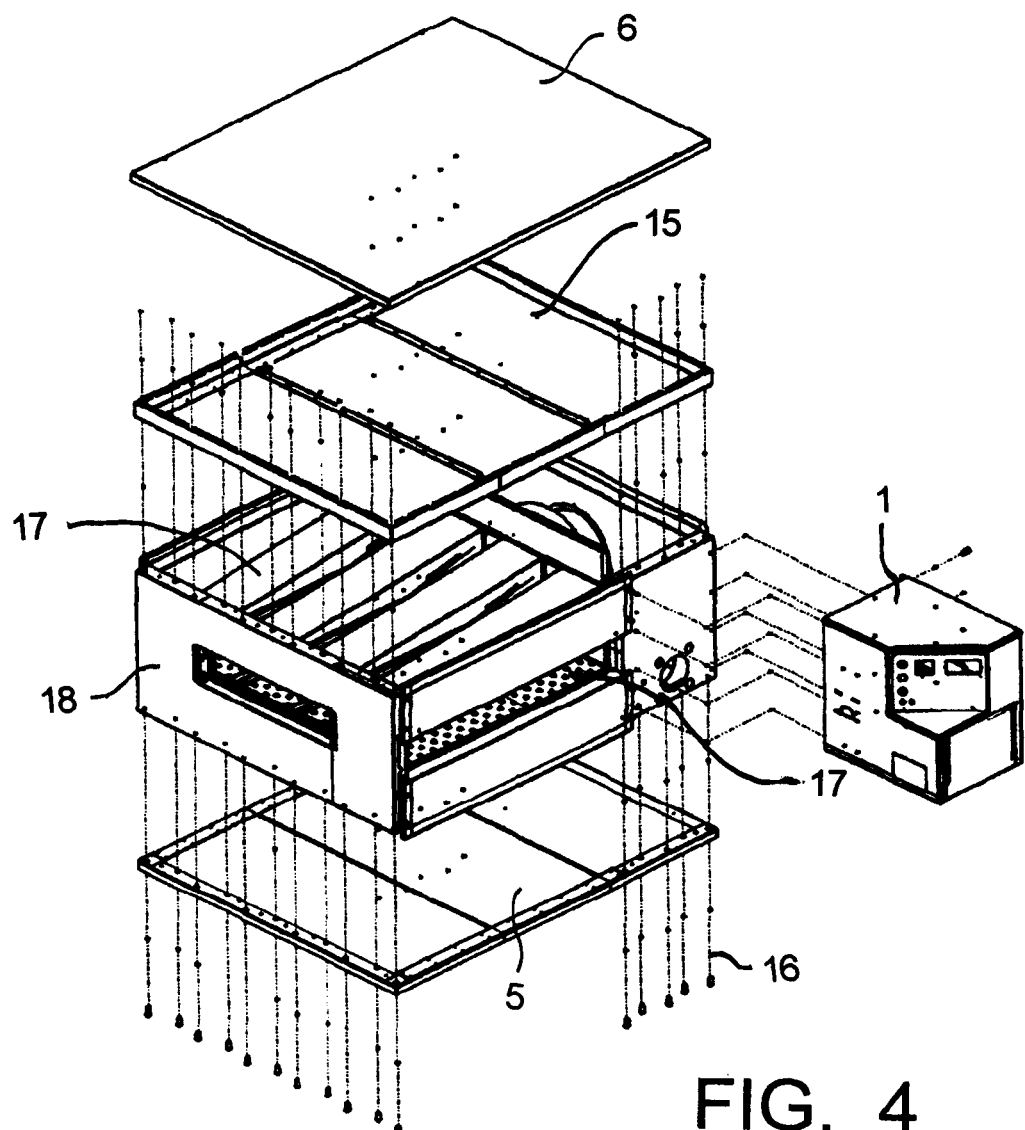
FIG. 4 shows an exploded view of a modular pizza oven in accordance with at least one possible exemplification.

FIG. 4 shows an exploded view of a modular pizza oven in accordance with at least one possible exemplification. The control can 1, the other base 5, and the oven lid 6 our shown. In addition, insulating panel 15, fasteners 16, finger assemblies 17, and bake chamber 18 are shown. The fasteners 16 may be any appropriate fastener, such as bolts or screws. The finger assemblies 17 are located inside the bake chamber 18 and are utilized to guide heated air toward a product being moved through and baked in the baked chamber 18. For shipping, the components of the modular pizza oven may be shipped in separate containers to the customer, which containers, in accordance with at least one possible exemplification, could weigh anywhere in the range of approximately 10 to 70 pounds, which would be considerably less than the approximately 1000 pound weight of a single pizza oven unit. The customer, upon receipt of the components, may assemble and install the oven himself, essentially without the need for specialized lifting and installation equipment necessary for installing an approximately 1000 pound single pizza oven unit. In addition, the customer, upon determining an operating error or malfunction, or decrease in efficient operation of the oven, is able to remove the defective or malfunctioning component and send it to a repair center. Further, the customer could easily store an additional control can 1, so that in the case of a malfunctioning control can 1, the customer can easily replace the malfunctioning unit with the stored replacement unit, thereby minimizing any downtime in production. The malfunctioning control can 1 may then be sent out for repair or discarded.

FIG. 6 shows at least one possible exemplification of a finger assembly. The finger assembly comprises a housing 101, an inner panel 102, and an outer cover 103. Upon assembly of these components, the housing 101 and outer cover 103 matingly and sealingly engage with one another to enclose the inner panel 102. However, these components are not fixedly engaged with one another, and can be easily taken apart. The housing 101 and the outer cover 103 may be moved or slid along their length dimensions relative to one another.

Figure 5:
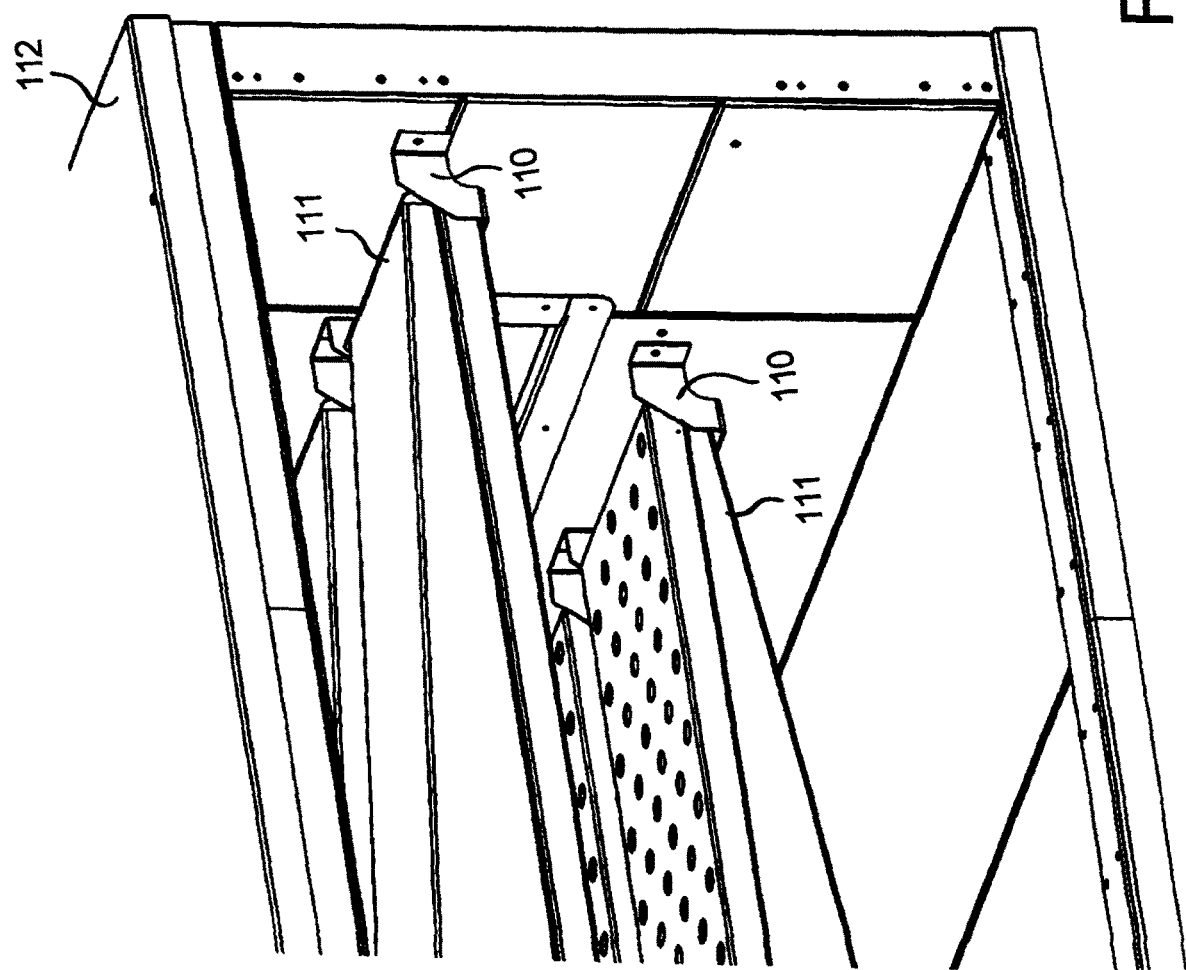
FIG. 5 shows at least one possible exemplification of a finger holder as installed in an oven.

FIG. 5 shows at least one possible exemplification of a finger holder 110 as installed in an oven 112. The finger holder 110 supports a closed, tapered end of an elongated finger assembly 111, which tapered end is disposed opposite a larger, substantially rectangular open end. The finger holder 110, which is shown in greater detail in FIG. 5A, is attached to the wall of the oven 112 by arms 110c of the finger holder 110. The tapered end is supported by support piece 110a, which support piece 110a connects and is substantially perpendicular to the two arms 110c. Connected to the support piece 110a is a flange 110b. The flange 110b is positioned with respect to the support piece 110a at an angle greater or slightly greater than 90°, such as 91°, 92°, 93°, 94°, 95°, 96°, 97°, 98°, 99°, or 100°, as well as tenths of a degree there between. In at least one other possible exemplification, the flange 110b is positioned with respect to the support piece 110a at an angle greater than 100°. To install the finger assembly 111, the open end of the finger assembly 111 is mounted flush against the plenum wall and to surround the opening in the plenum wall through which the heated air is conducted. The tapered end is then lowered and seated in or rested on the finger holder 110. The angular design of the flange 110b results in a pressing force or biasing force being exerted on the finger assembly 111. This pressing force minimizes, restricts, or essentially prevents relative movement between the housing 101 and the outer panel 103, thereby promoting or essentially guaranteeing that the housing 101 and the outer panel 103 form a closed, sealed space. To further explain, the pressing force causes the outer panel 103 to press flush against the plenum wall so that heated air exiting the hole in the plenum wall does not leak or flow through a gap between the outer panel 103 and the plenum wall. As discussed above, such a gap is undesirable as it would allow more heated air to flow into the portion of the oven nearest the plenum wall, resulting in uneven cooking and loss of pressure inside the finger assembly 111. In addition, the finger holder 110 is designed to flex during expansion and contraction of the finger assembly 111 to promote or essentially maintained a positive seal.

Figure 7:
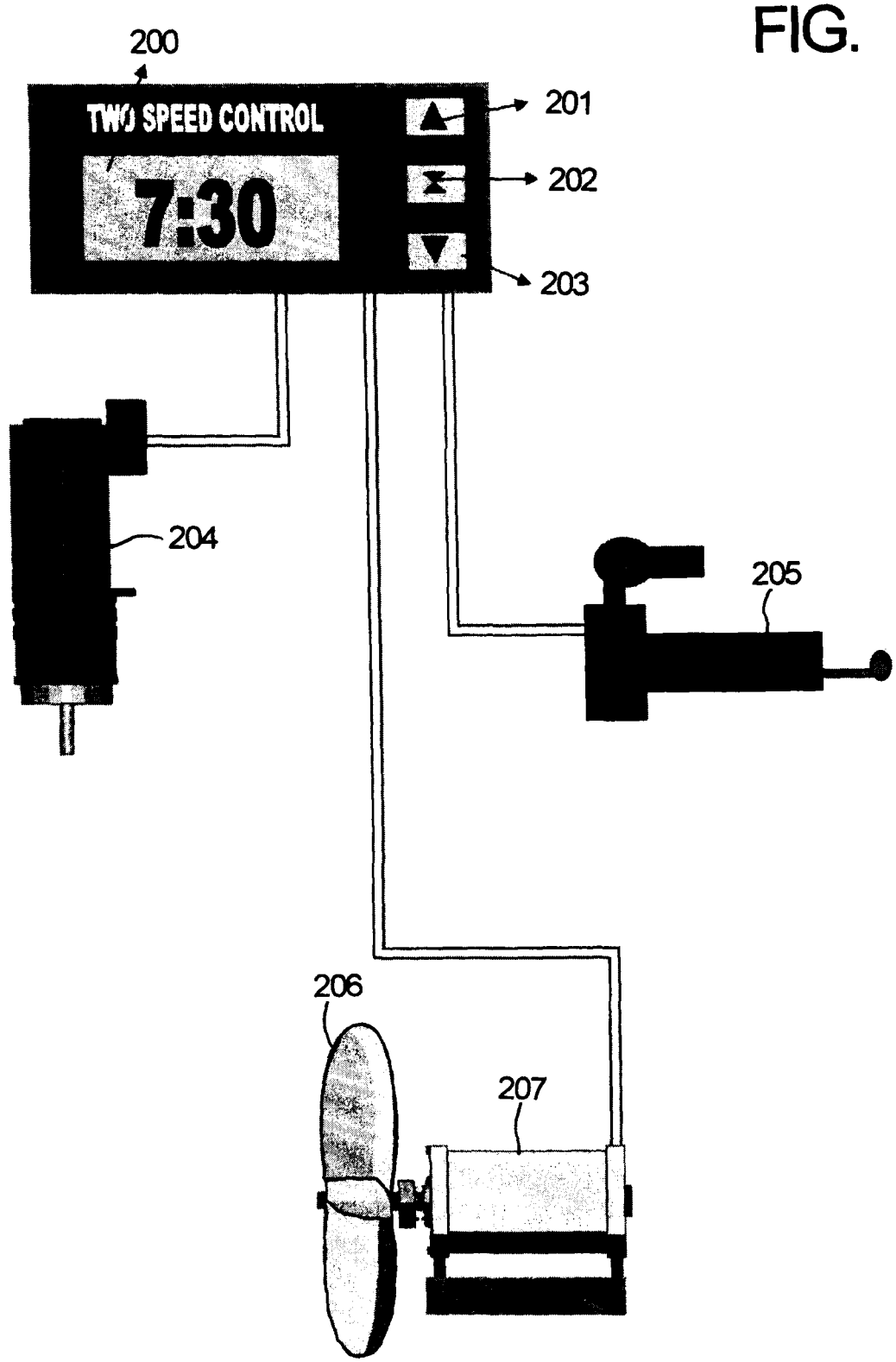
FIG. 7 shows schematically the components of a two-speed control arrangement for a pizza oven in accordance with at least one possible exemplification.
Figure 8A:
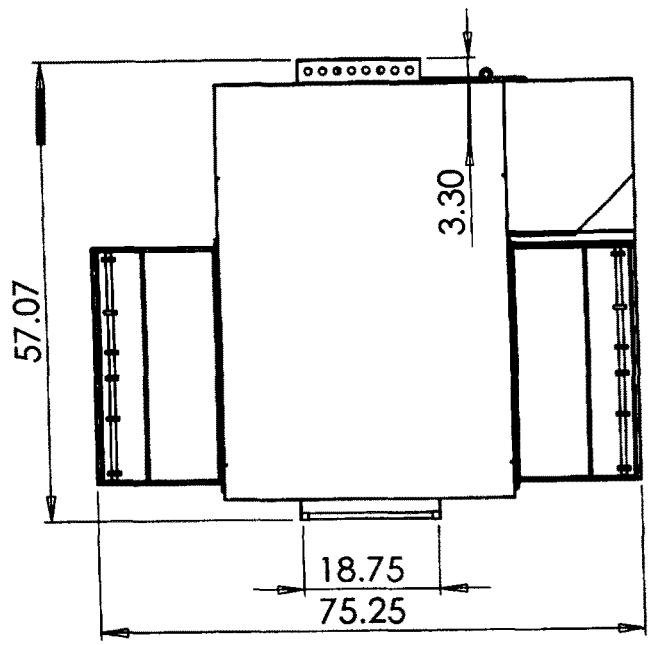
FIGS. 8A-8D, 9A-9D, 10A-10D, 11A-11D, 12A-12D, and 13A-13D show various exemplifications of pizza ovens in which at least one of the features or components described herein may be incorporated in accordance with at least one possible exemplification.
Figure 8B:
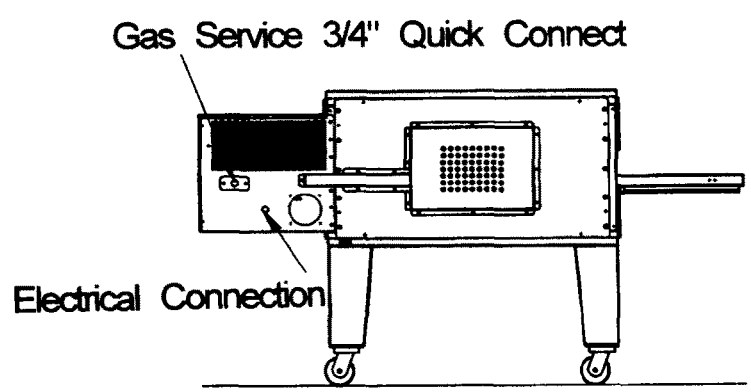
Figure 8C:
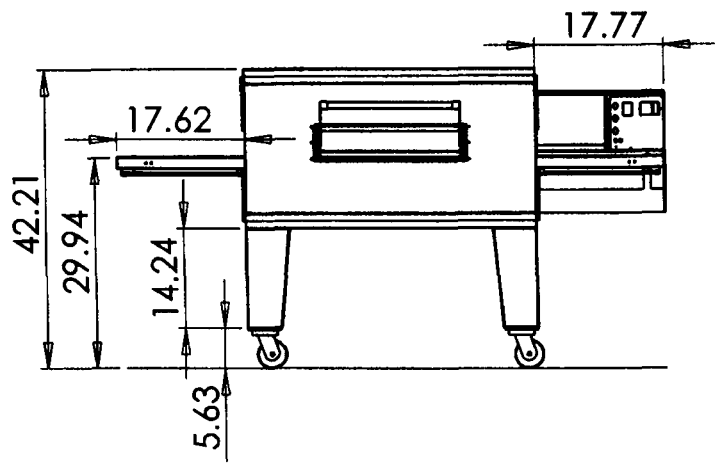
Figure 8D:
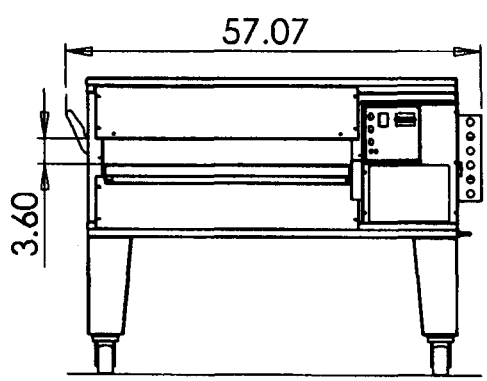
Figure 9A:
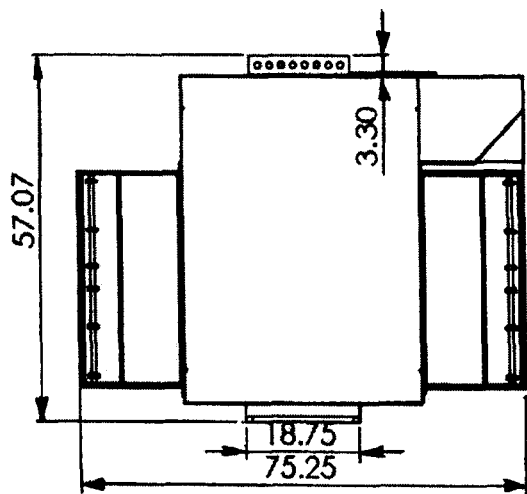
Figure 9B:
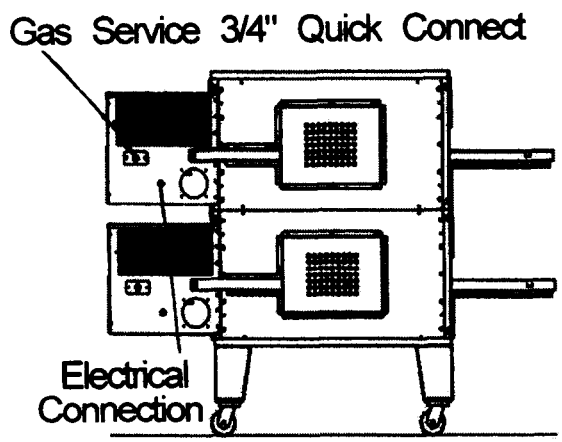
Figure 9C:
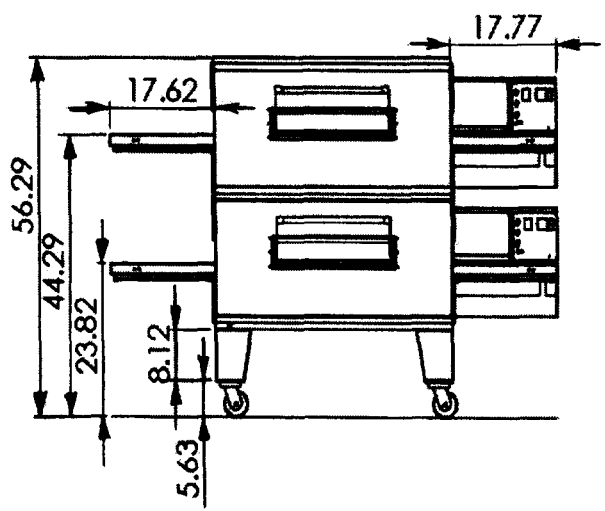
Figure 9D:
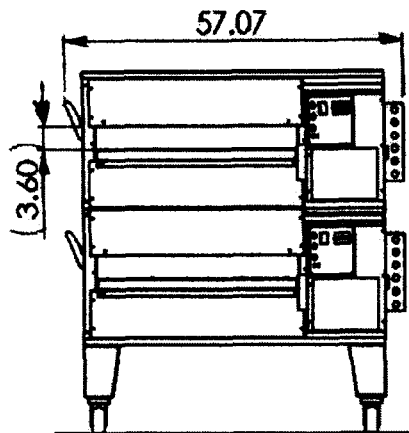
Figure 10A:
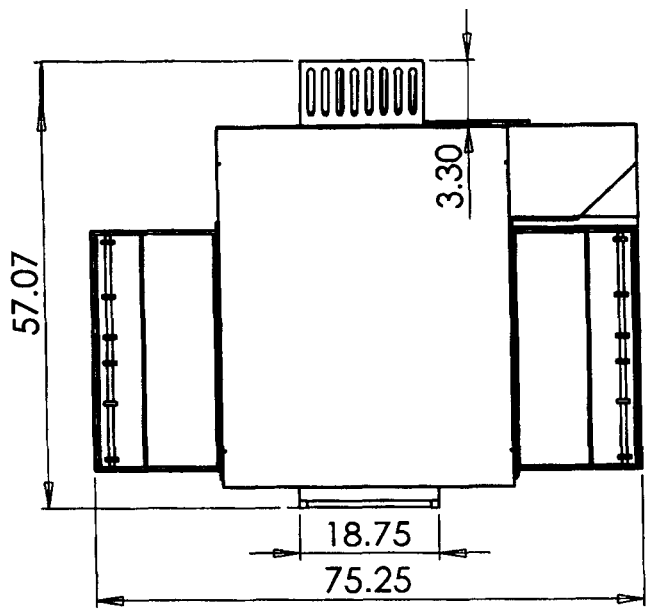
Figure 10B:
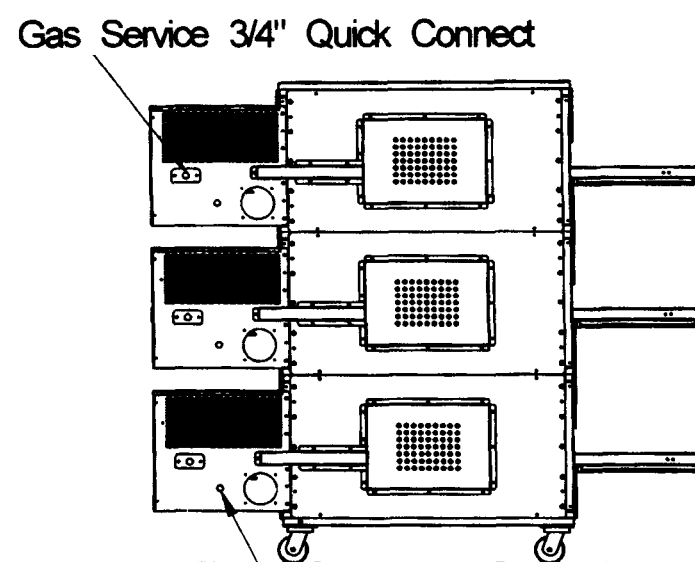
Figure 10C:
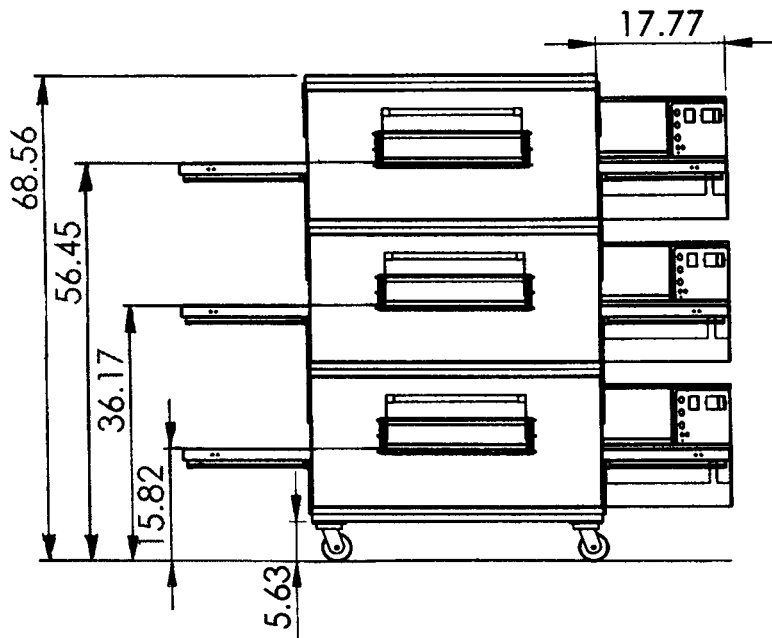
Figure 10D:
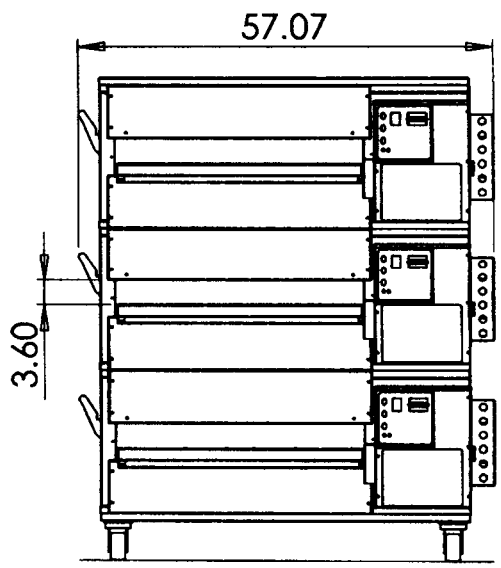
Figure 11A:
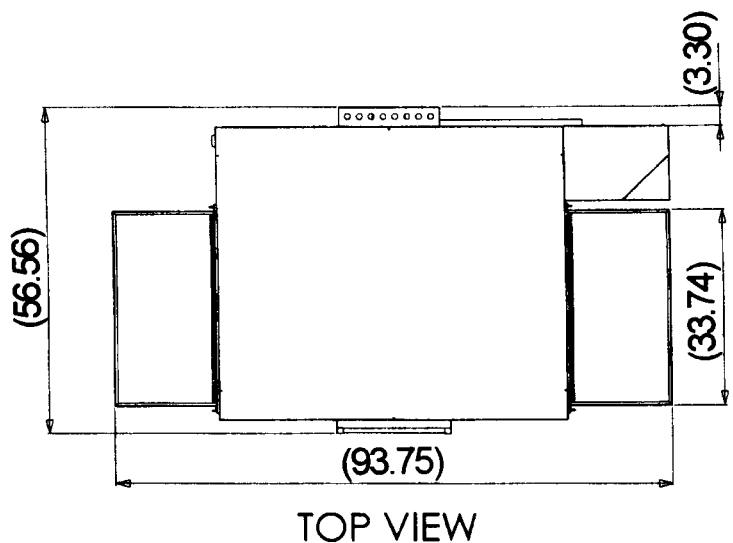
Figure 11B:
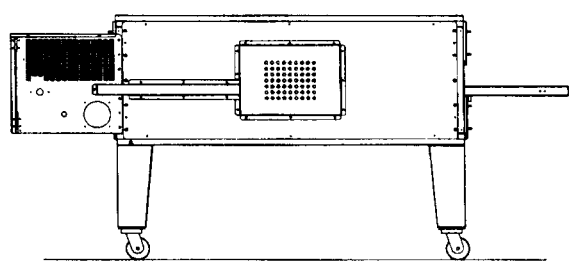
Figure 11C:
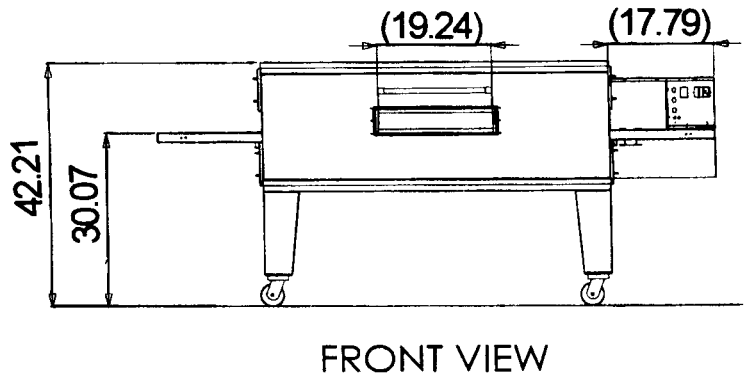
Figure 11D:
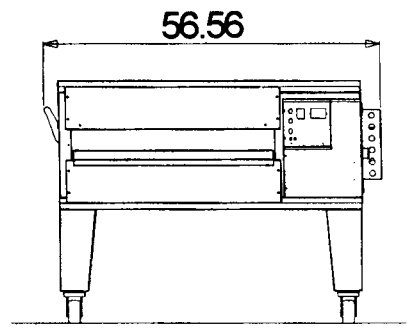
Figure 12A:
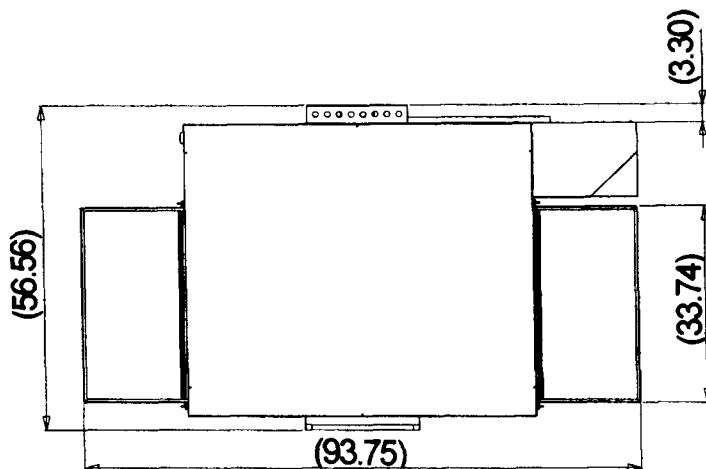
Figure 12B:
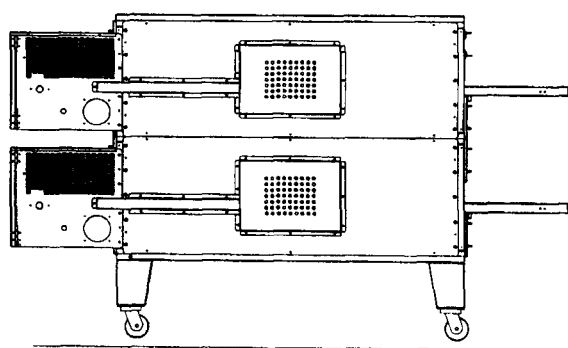
Figure 12C:
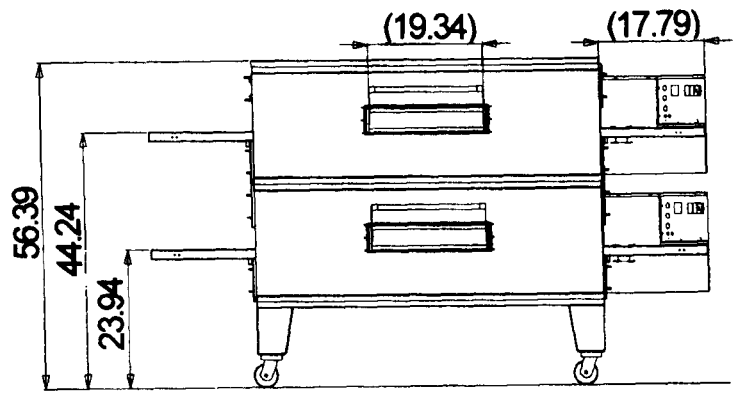
Figure 12D:
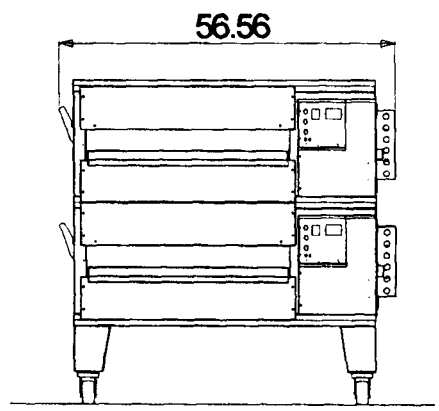
Figure 13A:
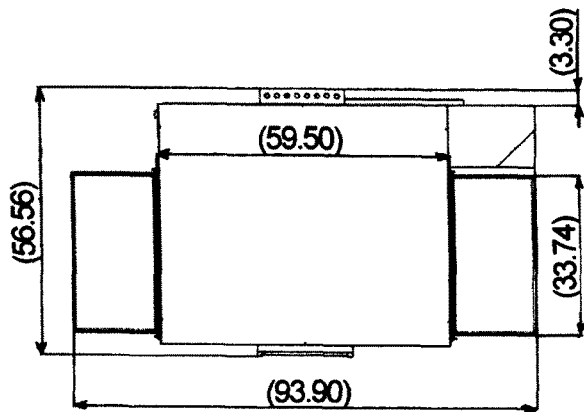
Figure 13B:
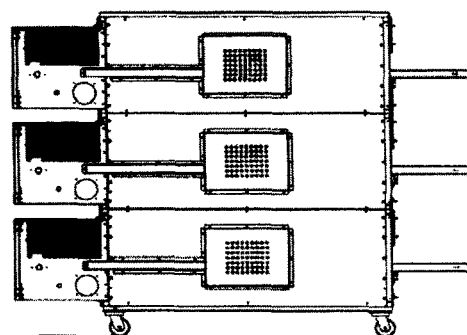
Figure 13C:
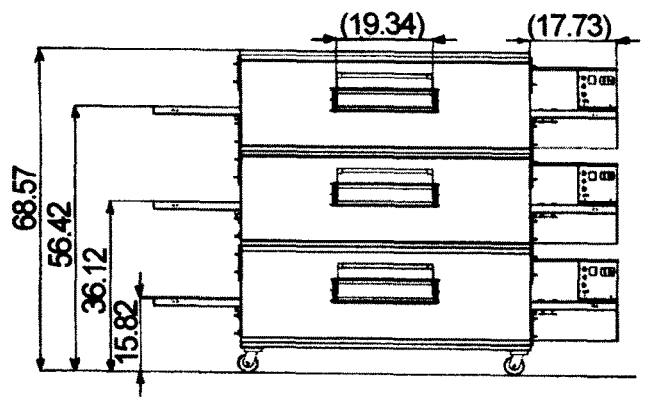
Figure 13D:
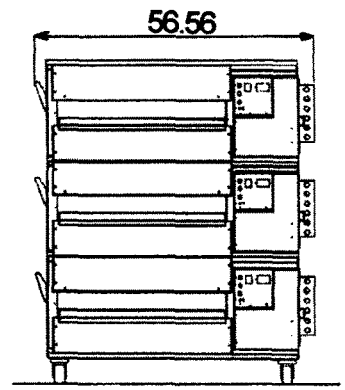

FIG. 7 shows schematically the components of a two-speed control arrangement which permits two-speed baking at a high and a low air flow setting in accordance with at least one possible exemplification. FIG. 7 shows a control 200 which displays the length of time for baking at a particular speed. There are two conveyor belt speed adjustment controls, namely a speed-increasing control 201 and a speed-decreasing control 203. There is also a toggle 202 which toggles between two different conveyor speeds. The control 200 is operatively connected to a conveyor motor 204, a burner assembly 205, and a blower fan motor 207, which is connected to a fan 206. The conveyor motor 204 drives the conveyor belt at a selected speed. The burner assembly 205 is used to increase or decrease the amount of gas and combustion air to change the British thermal units (BTUs). The blower fan motor 207 increases or decreases the RPMs of the oven fan.

In accordance with at least one possible exemplification, the control 200 is preset to operate the pizza oven and the components thereof at a "high" baking setting and a "low" baking setting. According to at least one possible exemplification, the high baking setting utilizes approximately 55,000 BTUs and can bake a product, such as a pizza, in approximately four minutes, while the low baking setting utilizes approximately 30,000 BTUs and can bake product, such as a pizza, in approximately seven minutes. The control 200 therefore coordinates the operation of the conveyor motor 204, burner assembly 205, and the blower fan motor 207 in accordance with the high baking setting and the low baking setting.

Upon installation of the pizza oven, the customer or installer adjusts the conveyor belt speed in relation to the high baking setting to achieve desired baking of a product at that speed and setting. The customer or installer then adjusts the conveyor belt speed in relation to the low baking setting to achieve desired baking of a product at that speed and setting. Once the speeds have been established for the conveyor belt, the customer need only press the toggle switch 202 to switch between baking settings. Once the toggle switch 202 is pressed, the control 200 sends out signals to adjust the speed of the conveyor motor 204, the BTU output of the burner assembly 205, and the speed of the blower fan motor 207 to the levels which correspond to the baking setting. For example, if high-speed or high-energy baking is selected, such as during peak business hours, the control 200 sends out signals to increase the BTU output of the burner assembly 205, as well as the speed of the blower fan motor 207 and conveyor motor 204. Then, if the operator desires to switch to low-speed or low-energy baking, such as during off-peak business hours, the toggle switch 202 may be pressed and the control 200 sends out signals to decrease the BTU output of the burner assembly 205, as well as the speed of the blower fan motor 207 and the conveyor motor 204. In addition, should the customer determine after installation and setting of the conveyor speeds that a higher or lower conveyor speed is desired for either the high baking setting or low baking setting, the customer may adjust the speed of the conveyor using the control to set a new conveyor speed. Such adjustability will result in energy savings, and thus cost savings, for the operator or owner of the pizza oven.

FIGS. 8A-8D, 9A-9D, 10A-10D, 11A-11D, 12A-12D, and 13A-13D show various exemplifications of pizza ovens in which at least one of the above-described features or components may be incorporated in accordance with at least one possible exemplification. Specifically, FIGS. 8A-8D and 11A-11D show a single pizza oven, FIGS. 9A-9D and 12A-12D show a double-stacked pizza oven, and FIGS. 10A-10D and 13A-13D show a triple-stacked pizza oven.

At least one possible exemplification of a pizza oven and components therefore is disclosed in the "Installation and Operating Manual" for the EDGE MODELS: EDGE40/EDGE60, Revision 1.1, published Dec. 4, 2008, by MF&B Restaurant Systems, Inc., 133 ICMI Road, Dunbar, Pa. 15431, which publication is incorporated by reference as if set forth in its entirety herein.

Figure 14:
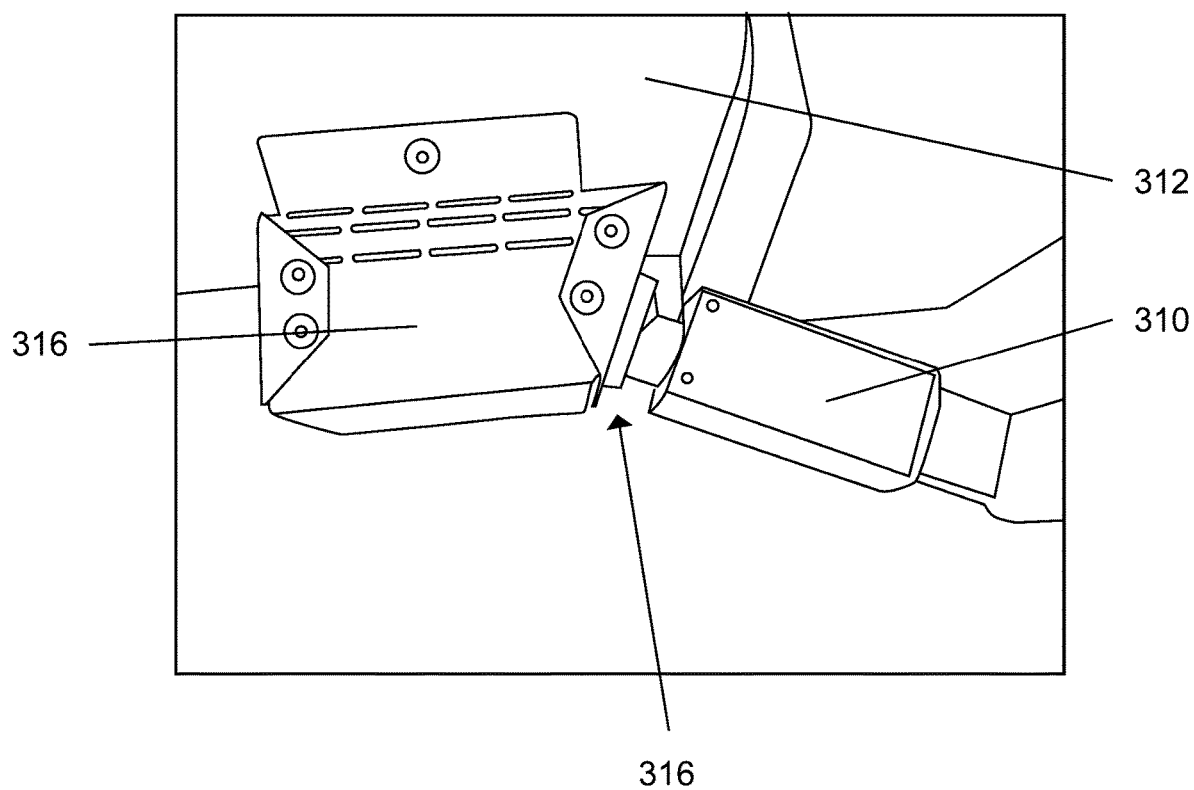
FIGS. 14-23 show components of a pizza oven burner arrangement in accordance with at least one possible exemplification.
Figure 15:
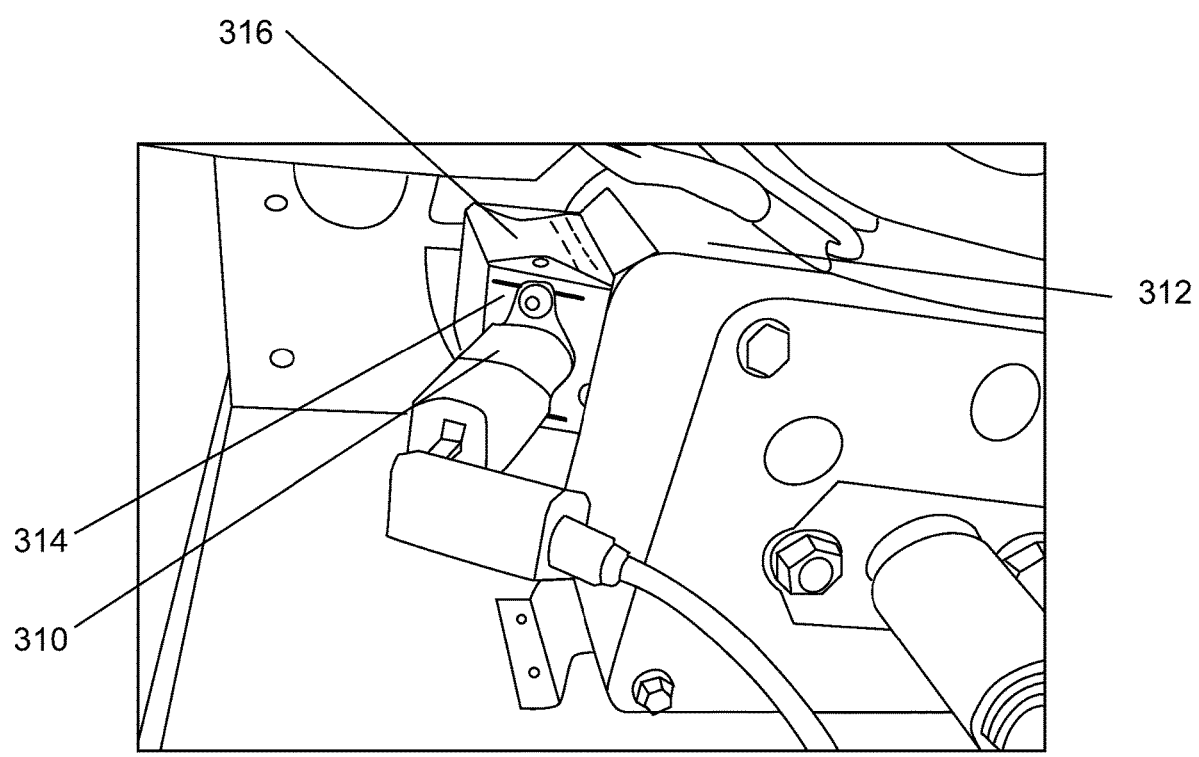
Figure 16:
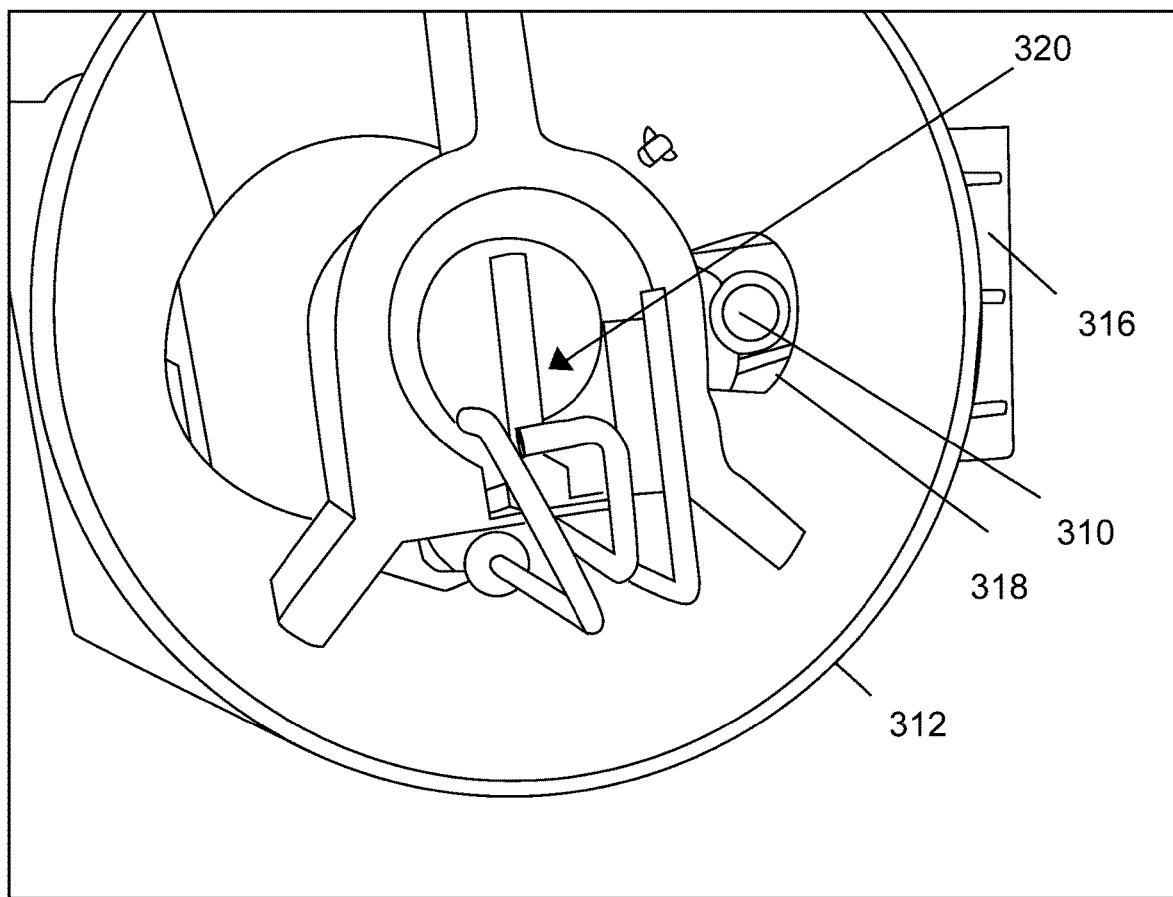
Figure 17:
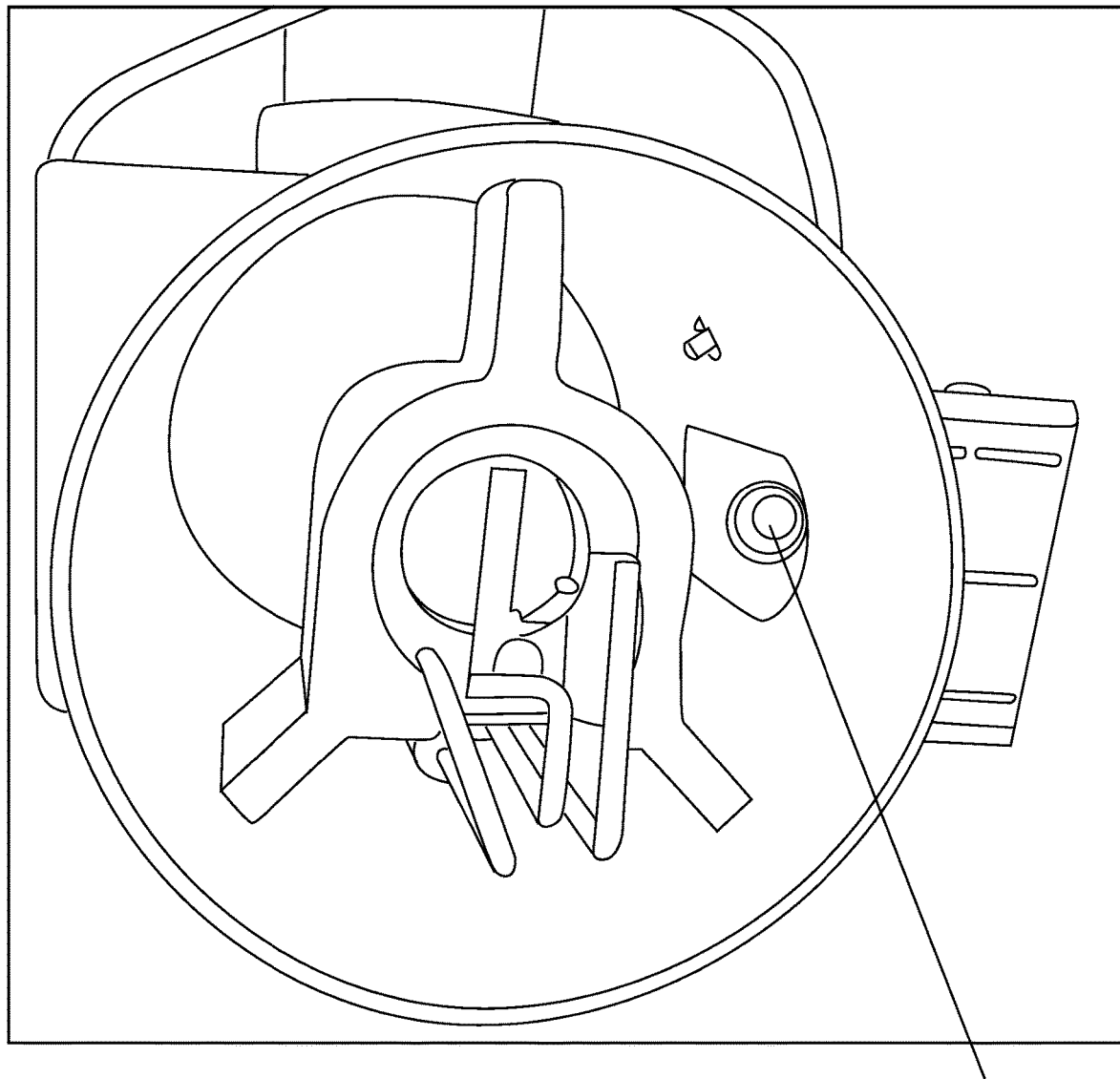
Figure 21:
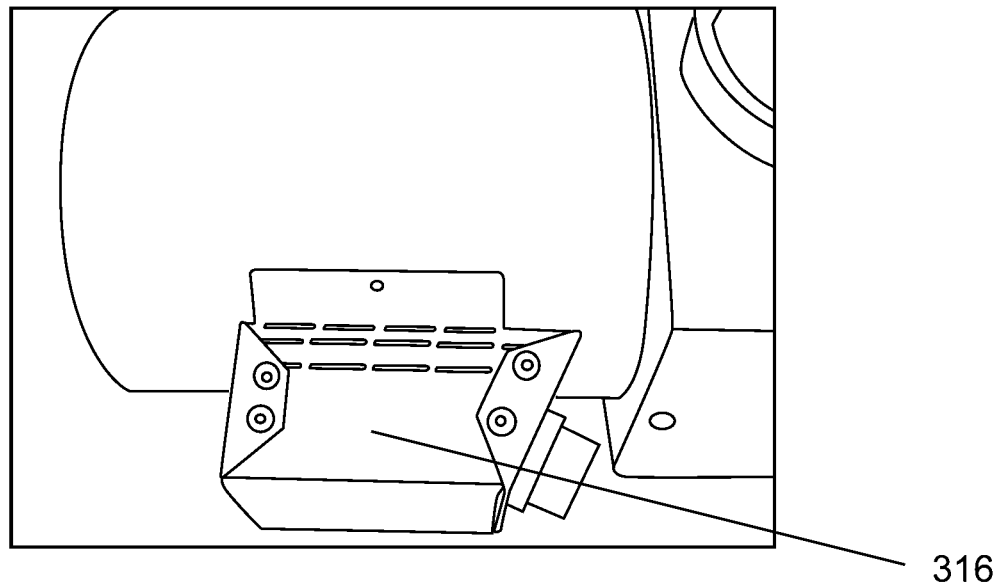
Figure 22:
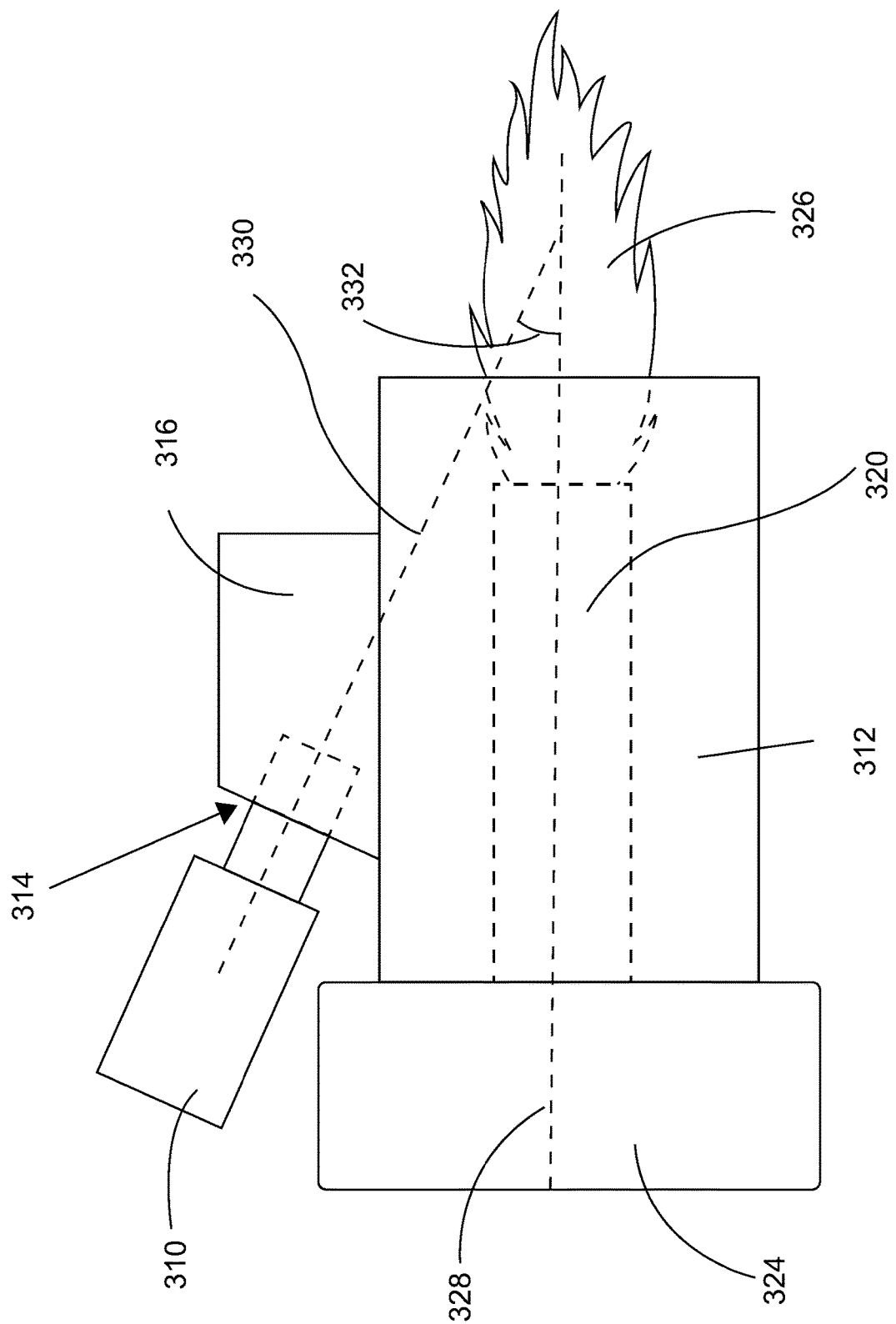
Figure 23:
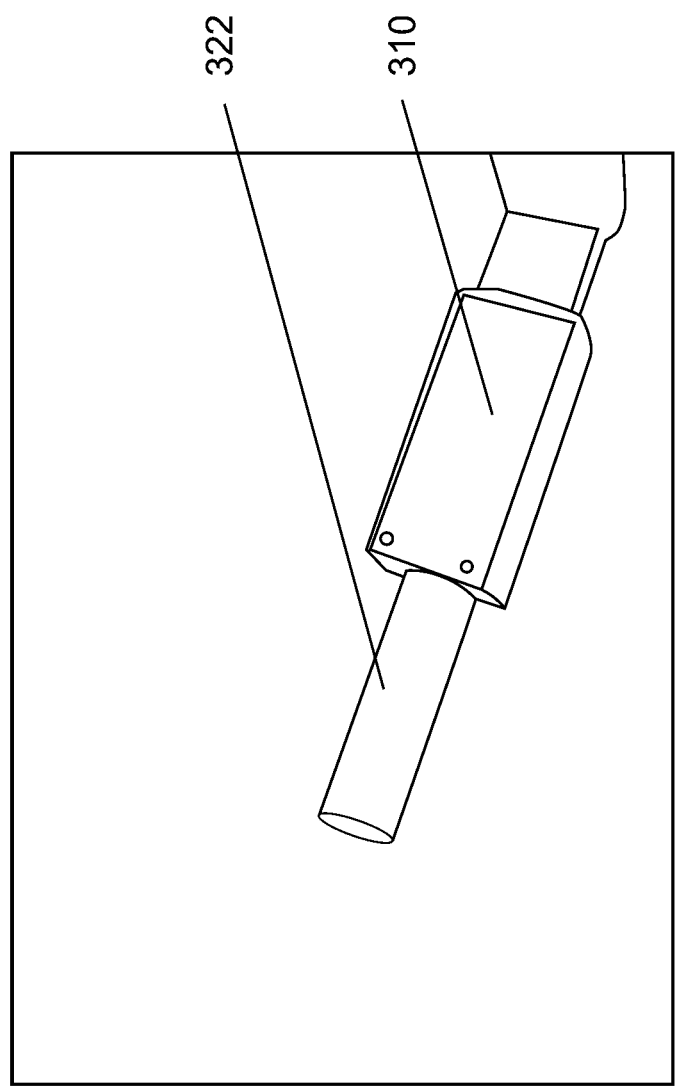

FIGS. 14-23 show components of a pizza oven burner arrangement in accordance with at least one possible exemplification. FIGS. 14 and 15 show a portion of a pizza oven burner arrangement in accordance with at least one possible exemplification. The burner arrangement has a tubular metal burner housing 312, in which gas is conducted to an ignition assembly to produce a flame. The burner housing 312 is mounted on or connected to a fan or blower unit. On the exterior of the burner housing 312 is a mounting bracket or mounting structure 316. In the exemplification shown in FIG. 14, the mounting bracket 315 includes ventilation openings, which ventilation openings are optional and thus could be omitted in other exemplifications. The mounting bracket 316 is hollow and generally box-shaped, but with an angled wall or angled support surface 314. A flame detection device 310 is mounted in or held by the mounting bracket 316 in order to permit detection of a flame being emitted out of said burner housing 316. In the exemplification shown, the flame detection device 310 is an optical flame sensor designed to optically detect a flame, or no flame, being emitted from gas burner 320, shown in FIG. 16. At startup of the oven, combustion gas, such as natural gas, propane, landfill gas, or similar combustible gas, is conducted through a tubular metal conduit of the gas burner 320 to an ignition assembly at the end of the gas burner 320, as shown in FIG. 16. A flame is produced and maintained at this ignition assembly. An end of the flame detection device 310 is visible in FIG. 16. An opening 318 (see FIG. 20) is cut or formed in the side wall of the burner housing 312. This opening 318 permits the flame detection device 310 to have a view of the flame. The flame detection device 310 includes detection or sensor optics 322 located at an end of the flame detection device 310. FIG. 17 shows that the detection optics 322 have a direct line of sight to a flame to be emitted by gas burner 320. A control assembly may be configured to control gas flow to gas burner 320 in response to the sensed flame or no flame being emitted from gas burner 320. FIG. 23 shows a view of only the flame detection device 310 with the detection or sensor optics portion 322.

Figure 18:
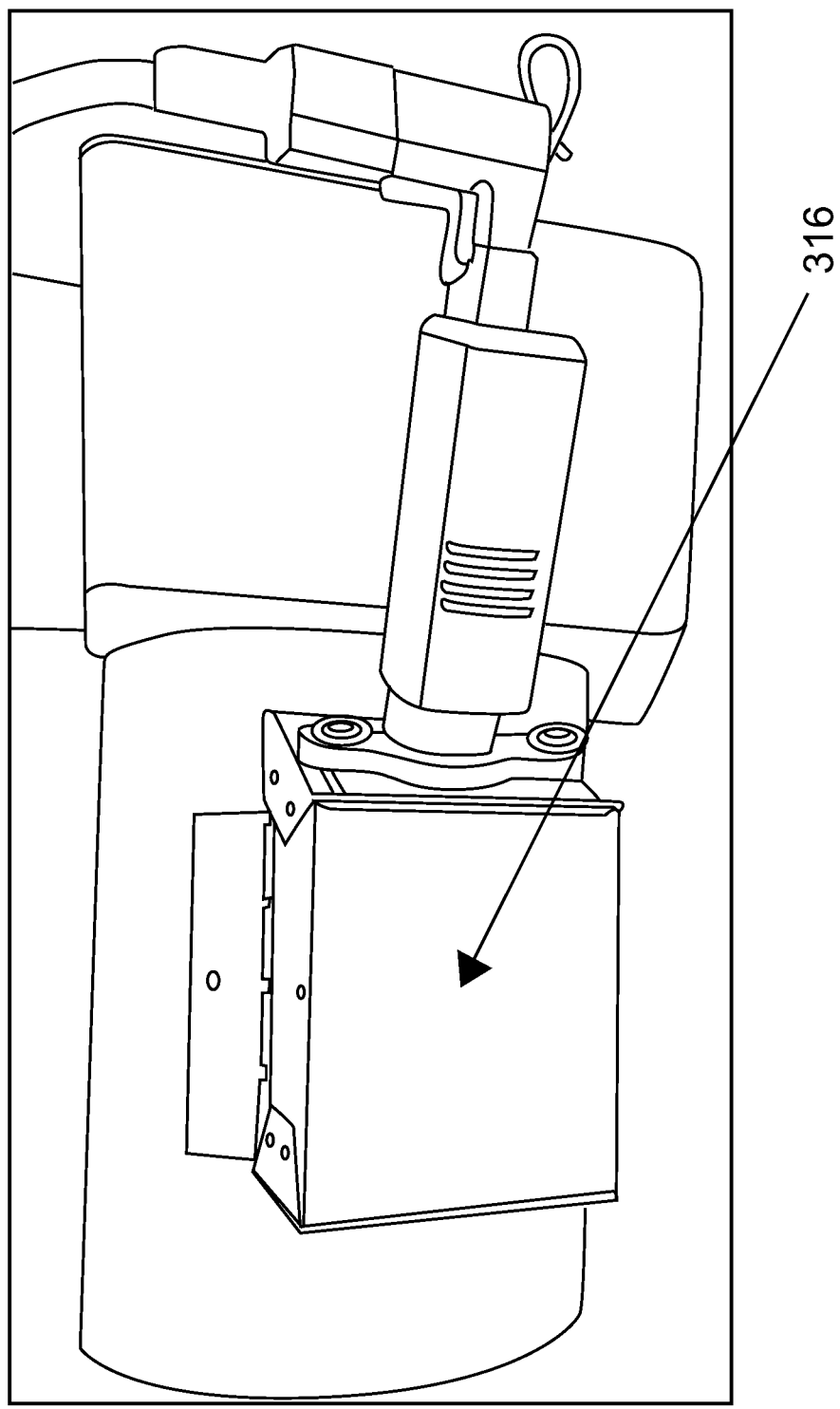
Figure 19:
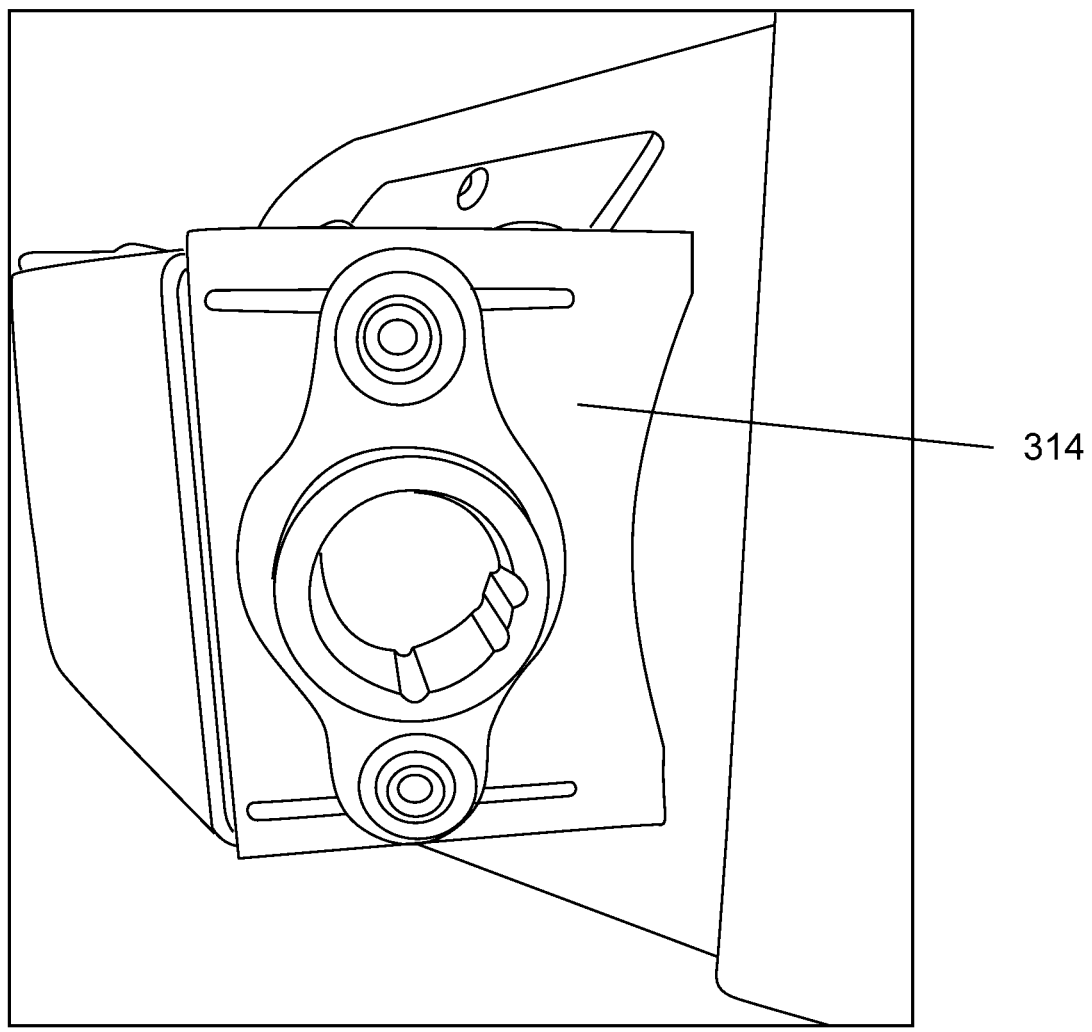
Figure 20:
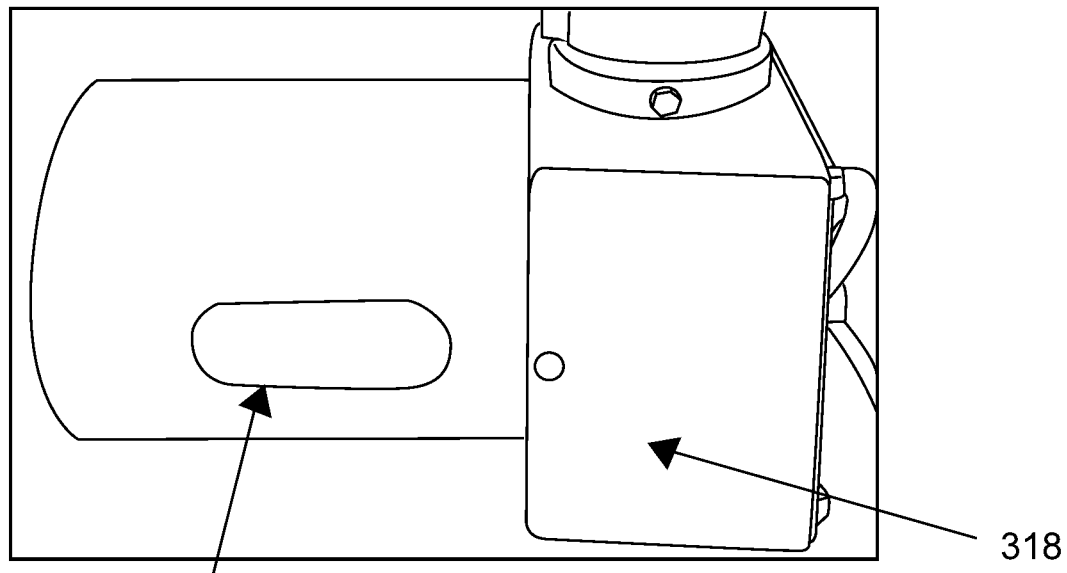

FIGS. 18 and 21 show other views of the mounting bracket 316 configured for mounting the sensor 310. FIG. 19 shows a close up view of the angled wall 314, which angled wall 314 has a shaped opening therein to permit the flame detection device 310 to be inserted through the opening and into the interior of the mounting bracket 316. As mentioned above, FIG. 20 shows the opening 318 in the sidewall of the burner housing 320, before the mounting bracket 316 has been attached to the burner housing 320.

FIG. 22 shows a diagram of components of a pizza oven burner arrangement in accordance with at least one possible exemplification. It should be noted that this diagram is for illustrative purposes to show the general design of the pizza oven burner arrangement, and thus portions thereof may possibly not be to scale. As shown in this exemplification, a blower arrangement 324 is connected to the burner housing 312. Disposed within the burner housing 312 is the gas burner 320. The mounting bracket 316 is connected to the side wall of the burner housing 312. The flame detection device 310 is mounted or held by the mounting bracket 316, wherein an end portion of the flame detection device 310 is partially inserted into the mounting bracket 316. In FIG. 22 a flame 326 is being emitted from the gas burner 320. The gas burner 320 and the flame 326 together generally define a longitudinal burner axis 328. The flame detection device 310 generally defines a longitudinal device axis 330. The device axis 330 and the burner axis 328 together define an acute, non-zero, angle 332.

As can be seen in FIG. 22, the flame detection device 310 has a line of sight along the device axis 330 past the gas burner 320 and to the flame 326. This line of sight is achieved by the design of the angled wall 314 of the mounting bracket 316. Since the flame detection device 310 is oriented essentially or substantially perpendicular to the surface of the angled wall 314, the angled wall 314 can be designed to determine the angle of the device axis 330 with respect to the burner axis 328. The angled wall 314 can therefore be manufactured and/or modified to achieve a positioning of the flame detection device 310 at a desired angle.

In at least one possible exemplification, the angled wall 314 may be configured such that the flame detection device 310, when inserted, has a device axis 330 at an angle 332 between about 15° and 35°, in steps of 1° or less, or less than 15°, or greater than 35°, with respect to the burner axis 328 of the gas burner 320. In at least one other possible exemplification, the angled wall 314 may be configured such that the flame detection device 310, when inserted, has a device axis 330 at an angle 332 between about 25° and 30°, in steps of 1° or less, with respect to the burner axis 328 of the gas burner 320. In yet at least one other possible exemplification, the angled wall 314 may be configured such that the flame detection device 310, when inserted, has a device axis 330 at an angle 332 of about 25° or exactly 25°, with respect to the burner axis 330. The angle 332 is selected to provide optimal line of sight, but also optimal detection of the flame.

The positioning of the hole 318, the mounting bracket 316, and the flame detection device 310 is selected in order to minimize damage and/or wear to the flame detection device 310. In current gas burner designs, two flame rods (visible in FIGS. 16 and 17) are used to form an electric circuit when a flame is active. When the circuit is not connected, that is, when the flame is out, a signal is sent to a control system to either shut off or prevent gas flow to the gas burner. Since the flame rods are actually positioned in the flame itself, the flame rods experience wear and become dirty due to soot other combustion products. One combustion by-product discussed herein is silica, which can be deposited on the flame rods. Silica coatings inhibit or prevent conductivity of the flame rods, thereby causing an incorrect detection of no flame when a flame is actually present. Again, since the flame rods are directly in the flame, silica coatings can form relatively quickly, necessitating difficult cleaning and/or replacement of the flame rods on a regular or frequent basis. To avoid and/or minimize wear to the flame detection device 310, as well as to avoid and/or minimize the optics 322 becoming dirtied or coated with soot, silica, or other combustion products, the flame detection device 310, as best seen in FIG. 22, is positioned a substantial distance away from the end of the gas burner 320 and the flame 326, that is, near or adjacent the midway point of the burner housing 312 along the burner axis 328. Since the flame, heat, and combustion products are all generated at the end of the gas burner 320 and are directed away from the gas burner 320 out of the end of the burner housing 312, very little contaminant materials will reach the flame detection device 310. The flame detection device 310 is not only positioned a substantial distance away from the end of the gas burner 320, but it is also positioned a substantial distance from the body of the gas burner 320, such that no portion or a very small portion or a small portion of the end of the flame detection device 310 projects through the hole 318 and into the burner housing 312. In the exemplification shown in FIG. 22, the flame detection device 310 is positioned such that no portion, or possibly only a very small portion, of the flame detection device 310 projects into the interior of the burner housing 312. Again, this positioning is selected to keep the flame detection device 310 as far away from the combustion occurring at the end of the gas burner 320 as is reasonably possible. Since the flame detection device 310 utilizes an optical detection, the detection of the flame can be done at such a distance but without sacrificing accuracy. In addition, the need to maintain or even utilize the flame rods is no longer required, which results in less down time and lost productivity due to cleaning and maintenance.

FIGS. 24-31 show components of a pizza oven air guide arrangement in accordance with at least one possible exemplification. The pizza oven shown in FIGS. 24-31 utilizes heated air, the movement of which is controlled by an air circulation system. The air circulation system generally includes a main circulation motor and fan blade to generate air flow, air input openings and return openings, and air guide structures, such as finger components with a plurality of openings therein. In the exemplification shown, the air circulation system also includes components of a return air management (R.A.M.) system, which will be discussed further herein below.

The main circulation motor and fan blade (not shown) can be selected for appropriate air movement based on the oven model and characteristics. Larger ovens, such as those over 60" in length (parallel to the path of travel of the conveyor) and/or over 32" in width (perpendicular to the path of travel of the conveyor), can use a variable frequency drive and a three-phase motor to achieve the RPM needed to rotate a larger fan. Oven models with a length of 60" or less and/or a width of 32" or less can utilize a one-phase motor and smaller fan blades. The selection of the appropriate motor, motor drive, and fan blade are all important factors in developing a desired amount of air flow in the oven sufficient or appropriate for maximum efficiency and optimal baking or cooking of products.

For delivery of heated or hot air into the baking chamber, finger components or assemblies, such as those shown in FIGS. 5 and 6, can be used. The finger components may comprise a finger housing, a finger air diffuser, a finger air collimating panel, and a finger cover. The finger housing has a ramped design, much like a manifold, to stabilize the pressure through the finger as air escapes across the finger assembly. The finger air diffuser utilized by the oven stabilizes the air flow as it populates the finger assembly. This technique reduces the pressure differences front to back and side to side with the finger assembly, resulting in even distribution of impingement air. The collimating panel is customer selectable, so that the oven can be built exactly to the needs of the product, bake time, and bake temperature. The final component of the finger assembly, the finger cover, comprises perforations or impingement holes. These impingement holes vary by the model they are created for. Impingement hole size affects the volume of air flow and the pressure of that air flow.

In addition to these components, the air circulation system shown in FIGS. 24-31 includes components of a return air management system that aids in the distribution of return air throughout the oven. Not all models of pizza ovens require these components to be installed, but all models are capable of accepting this technology. To explain how the return air management system works, it should be noted that the oven baking chamber can be represented in basically four quadrants: top-left, top-right, bottom-left, and bottom-right, as viewed from the side in a direction transverse to the conveyor length (such as in FIG. 31). The return air management system is basically comprised of four covers or panels or plates or duct structures, one in each of the quadrants. These covers form, in conjunction with the top and bottom wall surfaces of the baking chamber, return air ducts for guiding air back into the return air openings in the side wall of the baking chamber. Each of the four covers includes a plurality of openings in the surface thereof that are arranged to create a desired flow of return air that is even or essentially even throughout the oven. The cover structure is manufactured in a manner that allows for direct fitting to the return air plenum of the oven. The return air management system helps the oven retain much of the heated air within the baking chamber by minimizing the intake of cooler air from outside the oven, and maximizing the circulation of heated air. The even distribution of return air within the return air management system also allows for a reduction in the main circulation motor and fan blade count from that which is usually employed in current oven designs. This reduction in electro-mechanical parts reduces the potential points of failure, thereby reducing potential maintenance and repair costs.

Figure 24:
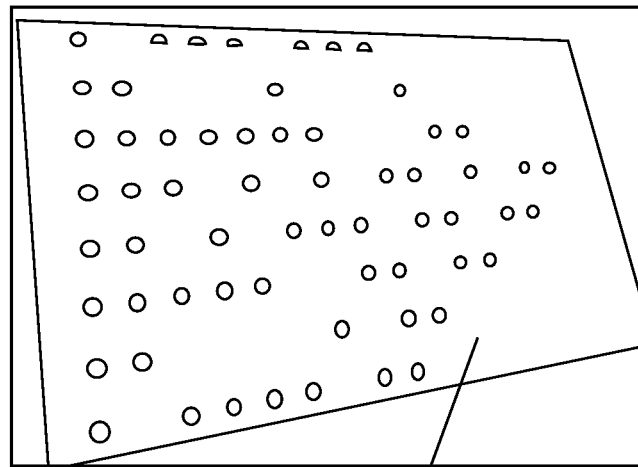
FIGS. 24-31 show components of a pizza oven air guide arrangement in accordance with at least one possible exemplification.
Figure 25:
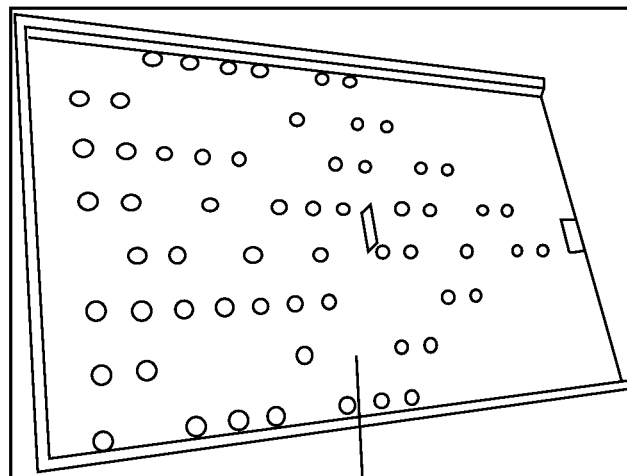

FIG. 24 shows a top or front view of an air guide structure 401, and FIG. 25 shows a bottom or back view. The air guide structure 401 is essentially shaped like a cover plate, wherein it has a flat cover portion 411 and three side portions or flanges 412 positioned transverse, or essentially or substantially perpendicular, to the flat cover portion. The flat cover portion 411 includes a plurality of holes therein, the positioning of which is selected to achieve a particular air flow, as discussed herein below in further detail.

Figure 29:
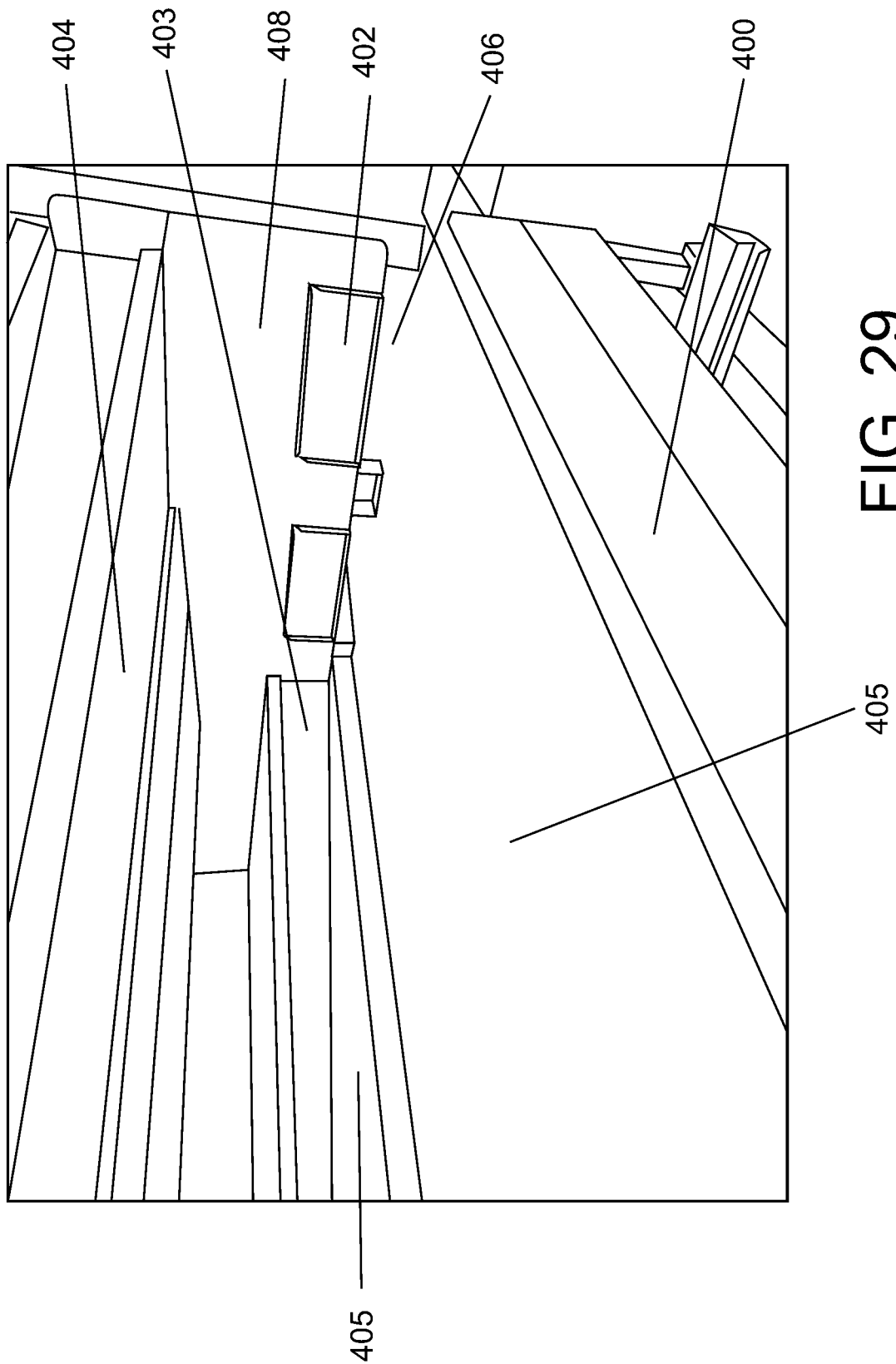

FIG. 29 shows the interior of a pizza oven 400 as seen through an opening in the end of the baking chamber. The view shown in FIG. 29 is facing the side wall 408 of the baking chamber, behind which the plenum is located. Input openings 402 permit hot or heated air to be conducted into the baking chamber. Return openings 406 permit air, which can be a mix of hot or heated air and cooler air from outside the pizza oven 400, to enter the plenum and be heated. A bottom wall 405 is also visible. Installed finger assemblies 403, 404 (also shown in FIGS. 5 and 6) and an air guide structure 401 are shown in the background. A similar view is shown in FIG. 30.

Figure 26:
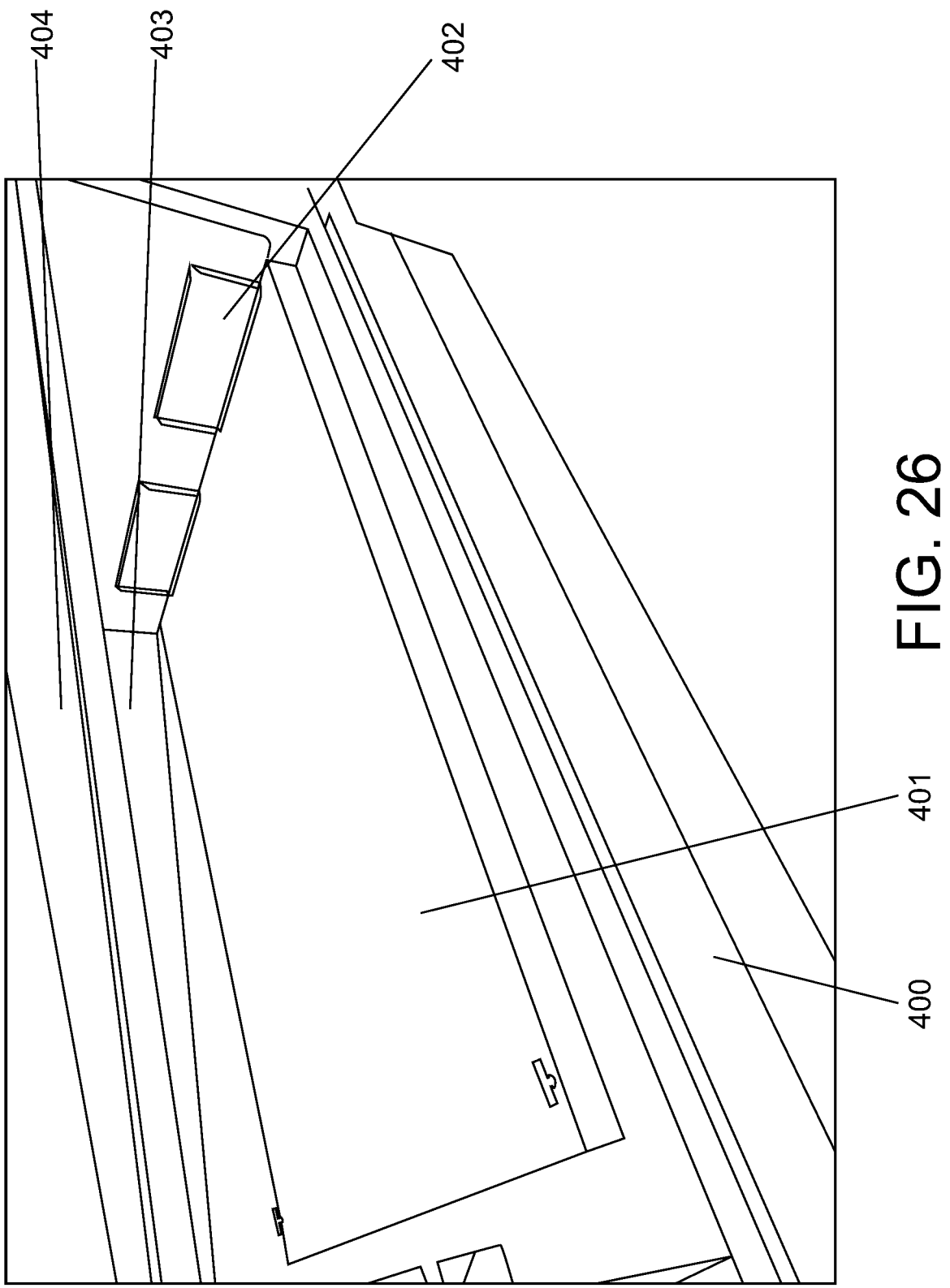
Figure 27:
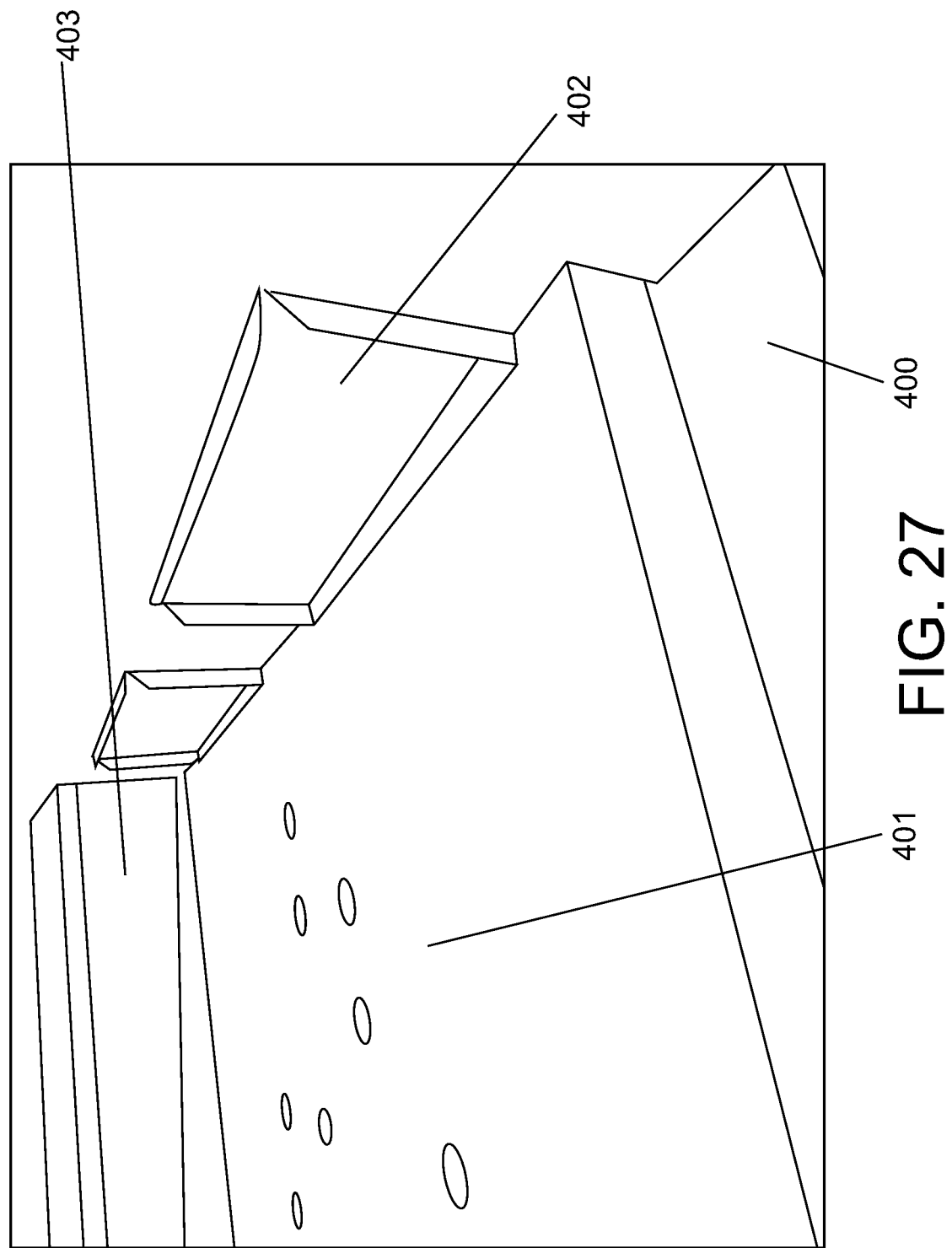
Figure 28:
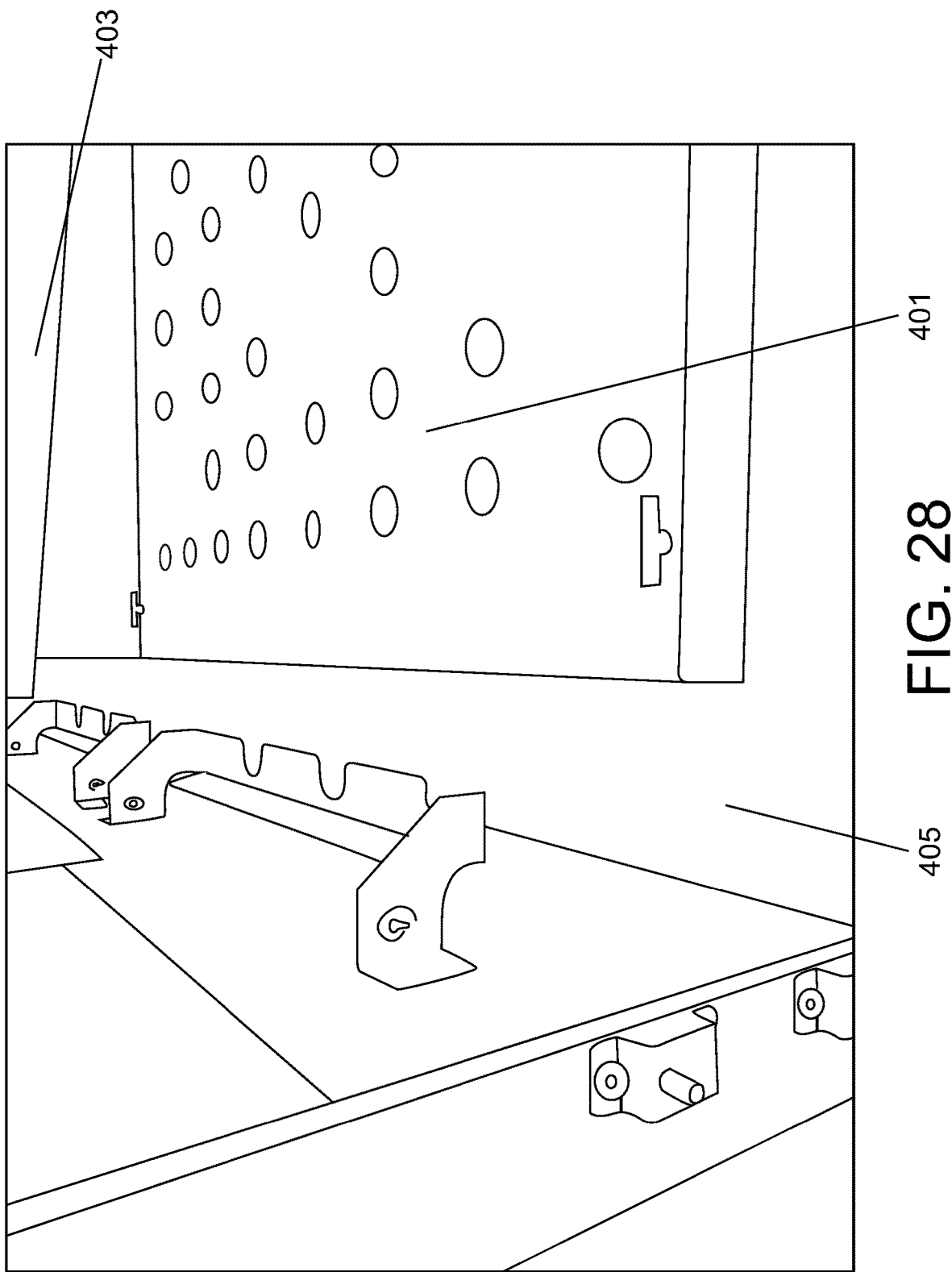
Figure 30:
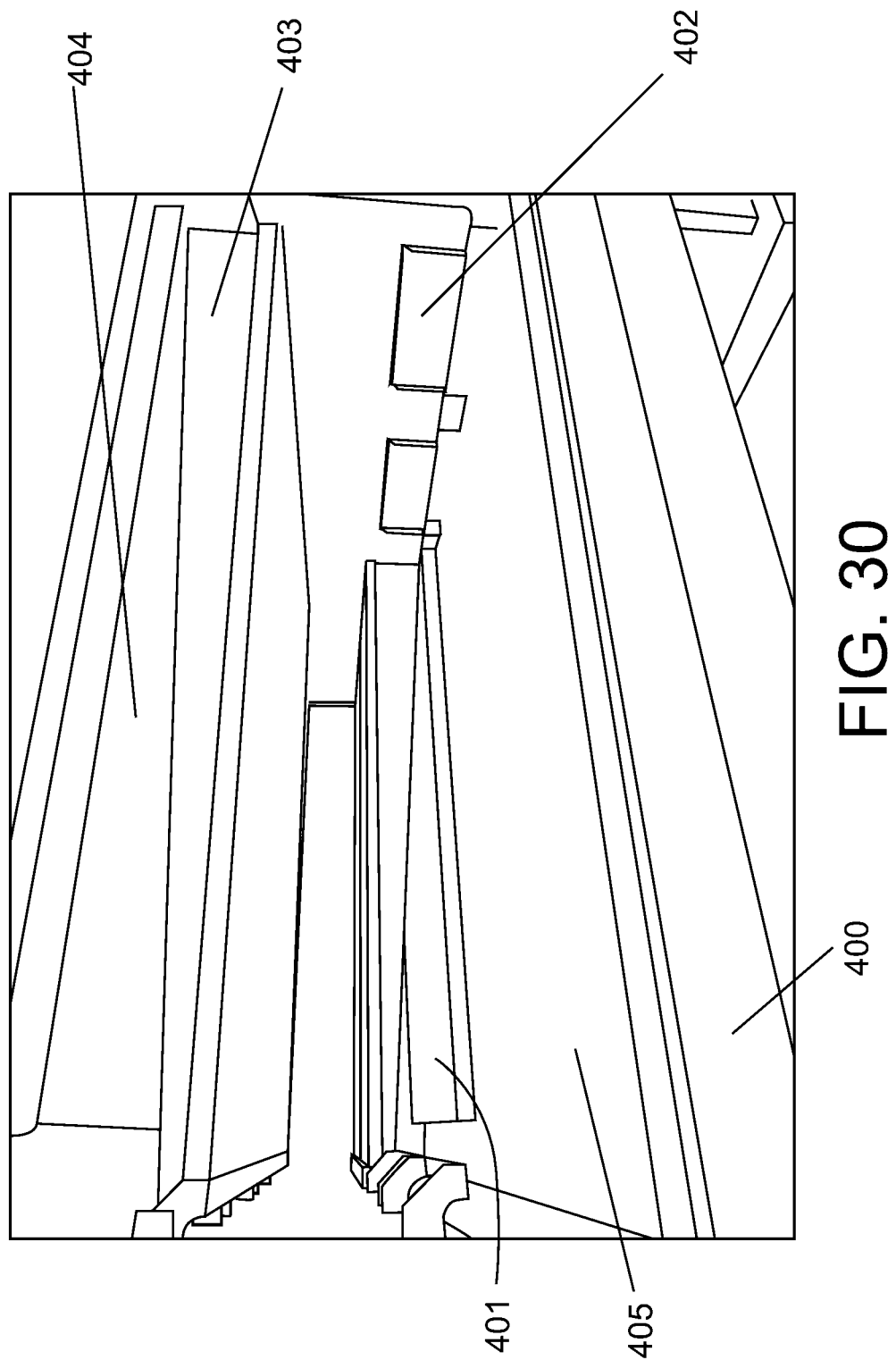

FIG. 26 shows a similar view as in FIGS. 29 and 30, but with an air guide structure 401 installed in the pizza oven 400. The air guide structure 401 rests on the bottom wall 405 with the top of the cover portion 411 facing up, supported by the three side walls 412. The cover portion 411, the three side walls 412, and the bottom wall 405 together form a return air chamber. Since there are only three side walls 412 on the air guide structure 401, the return air chamber has an open end. This open end is connected to a corresponding return opening 406, which is not visible in FIG. 26 since the air guide structure 401 covers the return opening 406, as better seen in the close up view in FIG. 27. FIG. 28 shows a close up view of the end of the installed air guide structure 401 disposed opposite the end connected to the return opening 406. It should be noted that the air guide structure 401 is designed to not extend all the way to the opposite side wall of the baking chamber, as shown in FIG. 28, in order to achieve a particular air flow, as discussed herein below in further detail.

Figure 31:
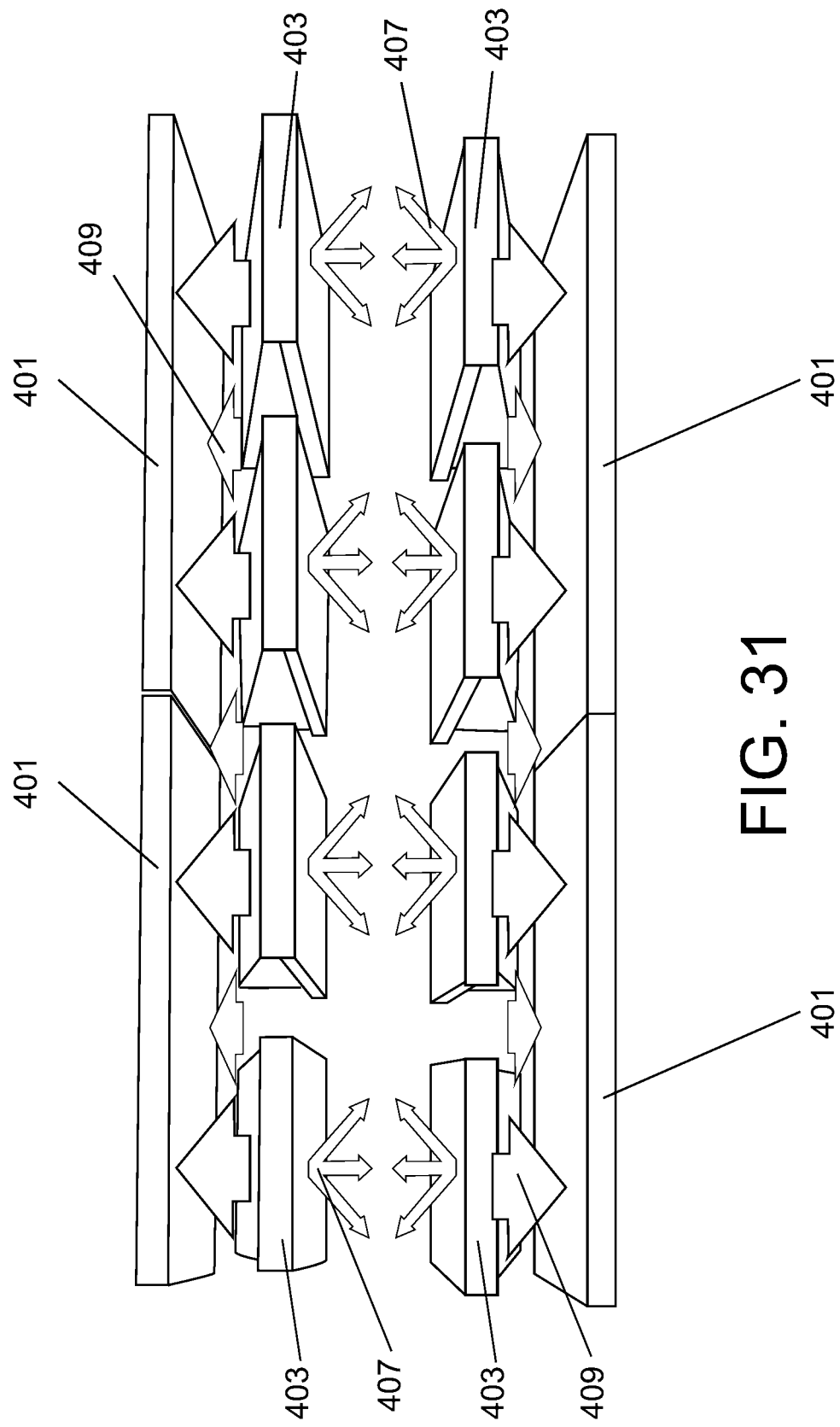

FIG. 31 shows a diagram of the components of one possible exemplification of an air guide arrangement. In at least one possible exemplification of a pizza oven, upper and lower sets of four finger assemblies 403 are installed to guide hot or heated air into the baking chamber through the pluralities of openings therein, as represented by the smaller arrows 407. Air is guided into the upper and lower sets of two air guide structures 401 through the pluralities of openings therein, as represented by the larger arrows 409. It should be noted that each of the finger assemblies 403 and the air guide structures 401 have pluralities of openings therein, but which have been omitted in some of the figures, such as FIGS. 26 and 31, for purposes of simplicity in showing the positioning of these structures in a pizza oven and in relation to one another.

Figure 32:
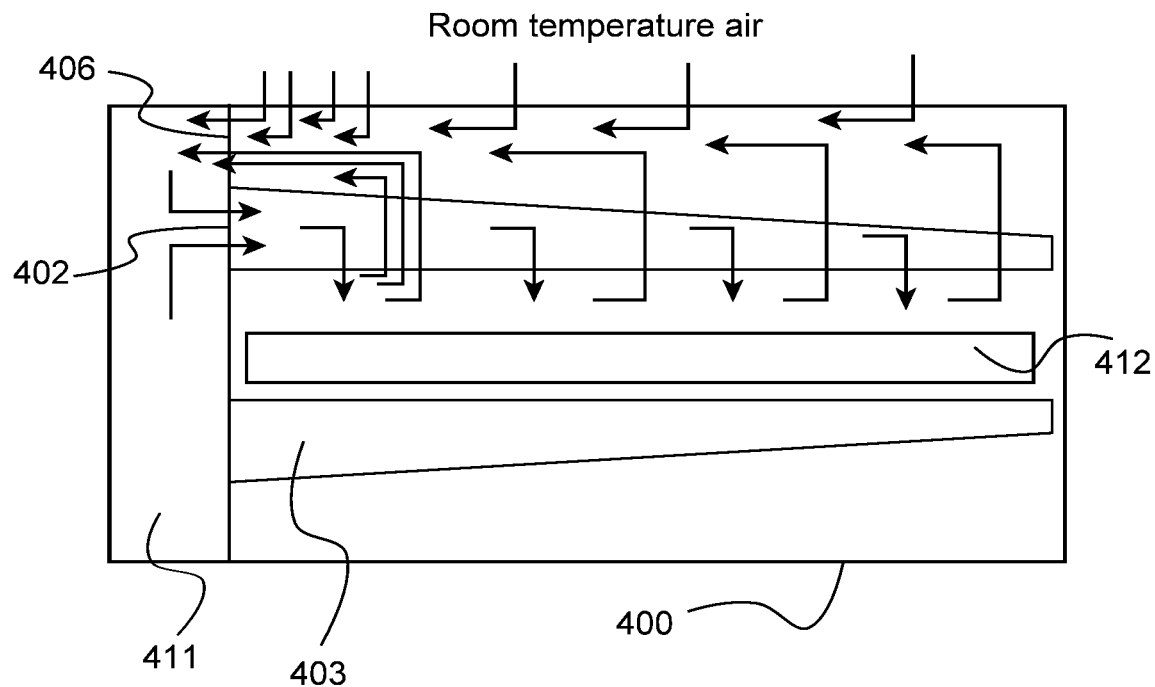
FIGS. 32-35 show diagrams of the flow of air through a pizza oven in accordance with at least one possible exemplification.

FIGS. 32-35 show diagrams of the flow of air through a pizza oven in accordance with at least one possible exemplification. FIGS. 32-35 are diagrams provided for exemplary purposes to illustrate air flow concepts in a pizza oven that incorporates both air finger assemblies 403 and air guide structures 401. FIG. 32 is a view into a pizza oven 400 looking through an open end (entry or exit) of the baking chamber. The sides of the finger assemblies 403 can be seen, which finger assemblies 403 are positioned above and below a conveyor 412. A pizza or other food product may be inserted into the oven 400 via the open end shown, or may be removed from the oven 400 via the open end, depending on how the oven is set up. An air guide structure 401 is not installed in FIG. 32. In operation, heated air flows through the plenum 411 and into the baking chamber via input openings 402. The heated air travels into the finger assemblies 403 and then exits via the openings therein, which are positioned to face toward the conveyor 412. The air is then circulated around the finger assemblies 403 and back into the plenum 411 via the return openings 406. In addition, some amount of room temperature air from outside the oven is drawn in via the return openings 406. In some ovens, this particular design works adequately and can evenly bake or cook food products, but does not work well or at all in other ovens.

To further explain, pizza ovens are designed in a range of widths, usually based primarily on the pizzas to be baked in a restaurant, most likely a pizzeria. For example, a common pizza oven might have a 32-inch width, that is, a 32-inch wide conveyor. The width of the conveyor is measured perpendicular to its direction of movement. For instances when the most common pizza size made by the pizzeria is 16 inches, a 32-inch conveyor is suitable as it can support two 16-inch pizzas placed side-by-side. In this manner, the maximum surface area of the conveyor can be used, with very little wasted space. Such maximized usage allows for maximized output of pizzas in a work day. This conveyor width can be selected by a pizzeria depending on the type of pizza to be cooked. For example, if a pizzeria usually cooks larger pizzas, such as 18-inch diameter pizzas, the pizzeria may use a larger oven with a wider conveyor, such as 38 inches.

However, some pizzerias might produce a very large number of pizzas and require an even wider conveyor to increase productivity. For example, a busy pizzeria may wish to place three pizzas, rather than two pizzas, side-by-side on the conveyor. If such a pizzeria most commonly sells 14-inch pizzas, this would not be possible on a 32-inch or 38-inch conveyor because the conveyor would need to be at least 42-inches wide (three pizzas times 14 inches=42 inches) to permit such positioning of the pizzas. Otherwise, the pizzas would need to be offset or staggered on the conveyor, which leads to less productivity and a substantial amount of unused conveyor surface. Being able to cook three pizzas simultaneously in the same amount of space (as measured along the length of the conveyor) as two pizzas is advantageous. Further, not having to stagger the pizzas and waste surface area is also advantageous. Approximately 40% to 50% more pizzas can be baked per hour in such a wider oven. For example, in a 32-inch oven, approximately 90 14-inch pizzas, baked for six 730 minutes, can be baked in one hour, whereas in a 44-inch oven, approximately 130 14-inch pizzas can be baked in one hour, which is about a 44% increase in output.

Unfortunately, pizza ovens cannot be scaled up in width indefinitely without a disruption in the air flow. For example, when the width is increased from 32 or 38 inches to 44 inches, the air flow suddenly suffers problems. To effectively push air out to the ends of the finger assemblies, the blower arrangement requires two or more regular blowers or a very powerful single blower, due to the increased width. In this situation, the draw or vacuum force of the return air is also very strong. Unfortunately, the vacuum force is unevenly distributed, with a very powerful or powerful or higher vacuum force right at the air return duct, but a much less powerful or less powerful or lower vacuum force near the middle and end of the finger assembly. This disproportionate or uneven vacuum force creates a few different problems. First, the higher vacuum force draws a substantial amount of room temperature air into the oven from outside the oven, as shown in FIG. 32. This outside air, which can be anywhere from around 65° F. to around 75° F., is drastically cooler than the air in the oven, which can be, for example, 250° F. to 500° F., depending on cooking needs. This cooler air needs to be heated, so drawing large amounts of cooler air into the oven is extremely inefficient as much more energy is needed to heat the air. Second, this large amount of cooling air cools the section of the conveyor closest to the air return opening 406. Third, the higher suction also quickly draws the hot air expelled from the finger assemblies 403 back into the plenum 411, rather than permitting the hot air to reside longer in the oven to bake or cook the food product. The combined effect of increased cool air coming in and hot air being drawn out too quickly results in a cooler zone on the conveyor adjacent the plenum 411. As a result, the food product in that area is not heated properly. For example, a 44-inch wide conveyor, as mentioned above, can accept three 14-inch pizzas placed side-by-side across the width of the conveyor. However, these pizzas end up being baked quite differently. The middle pizza and the pizza furthest away from the air return openings 406 are baked quite evenly to the desired quality. The pizza nearest the air return openings 406 is not cooked well at all, and is rather undercooked due to the cooler temperature in that region. Therefore, about one-third of the conveyor is located in a cooler zone, which can have a temperature that is anywhere from 20% to 30% cooler than other areas of the oven, and thus is unsuitable for cooking or baking the pizza as desired. This imbalance in flow of air is represented in FIG. 32 by the larger number of arrows near the air return opening 406, as opposed to the consistent and similar air flow represented by the arrows near the middle and end of the finger assembly 403. It should be noted that these arrows are for illustrative purposes and are not intended to exactly depict the air flow in the oven.

Figure 33:
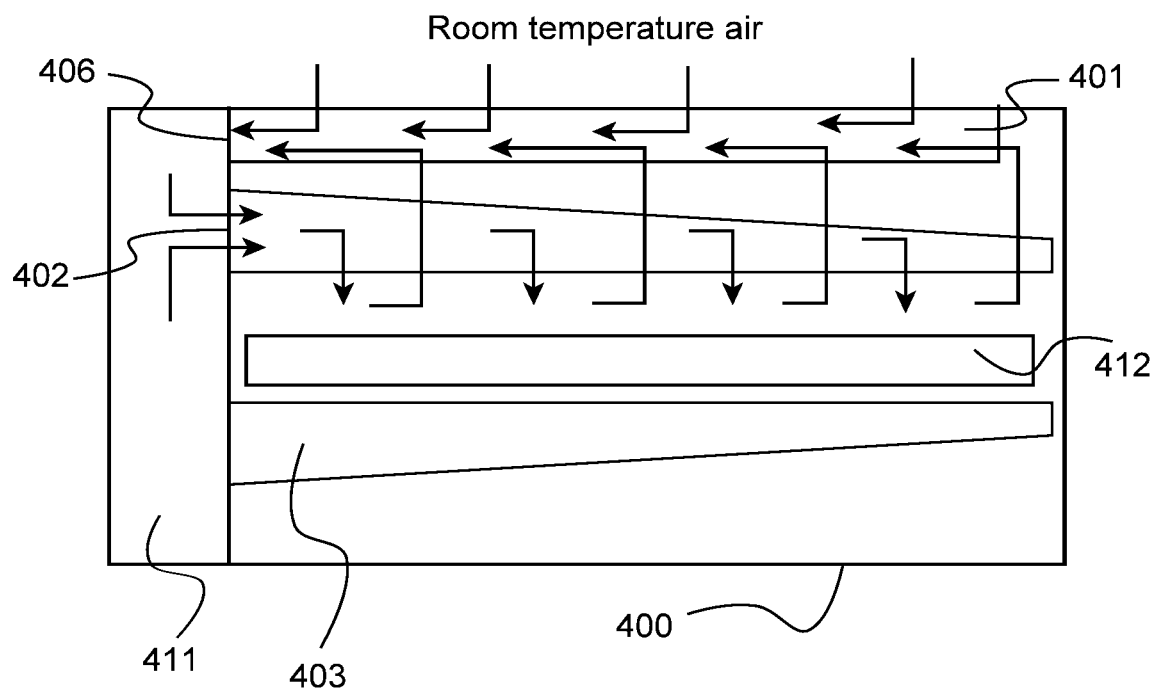

To overcome this problem, the return air guides 401 can be used. As shown in FIG. 33, when the air guide structure 401 is installed, the air flow is evened out, as represented by the arrows. The powerful draw at the return opening 406 is counteracted by the air guide structure 401.

Figure 34:
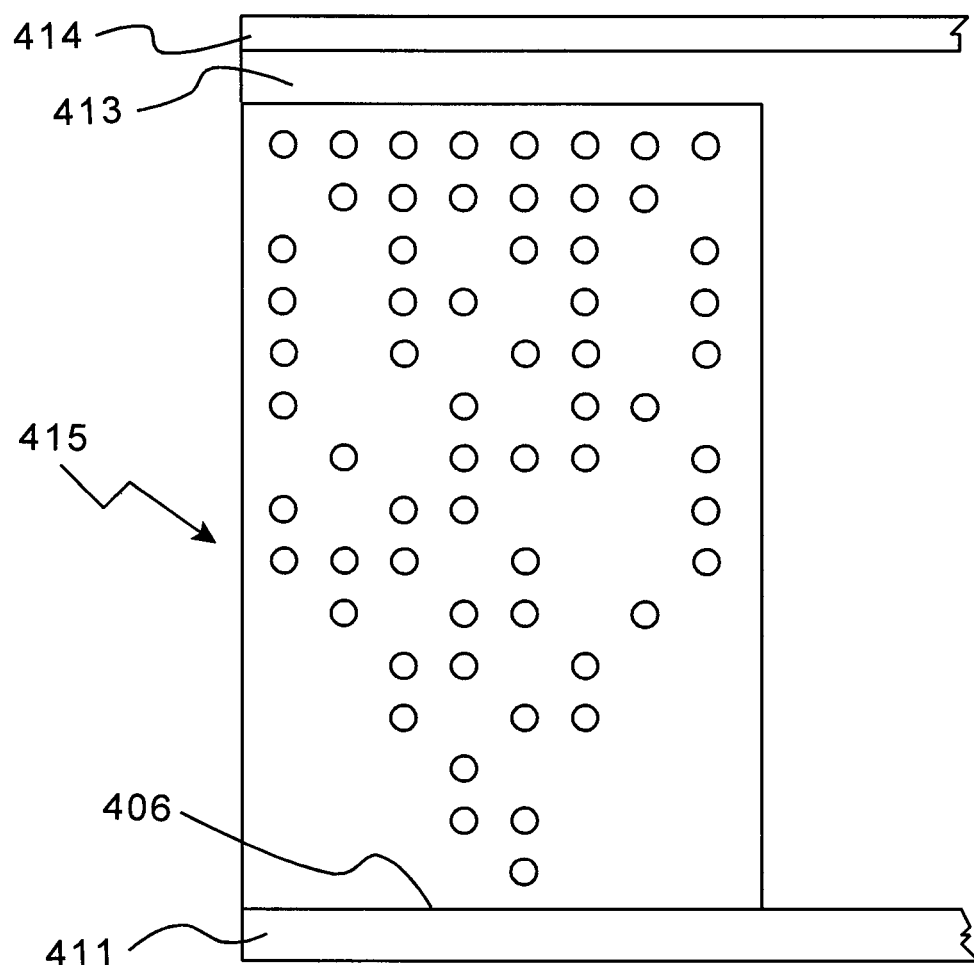

To further understand how the air guide structure 401 controls air flow, FIG. 34 shows a top view of an installed air guide structure 401, as viewed looking down through the pizza oven and the finger assemblies, which are not shown for simplicity. As can be seen in FIG. 34, the air guide structure 401 is placed flush against or inserted partially into the return opening 406 in the wall of the plenum 411. In the exemplification shown, the air guide structure 401 extends short of the opposite wall 414 of the baking chamber, thereby leaving a gap 413, which can be 3% to 15%, or possibly 5% to 10%, of the total width of the baking chamber. This gap 413 allows for easier installation and/or removal of the air guide structure 401 to permit cleaning. In addition, by not having the air guide structure 401 extend all the way to the wall 414, the hot air can reside in that region for a somewhat longer time since the hot air exiting the finger assemblies 403 in that region is slightly cooler due to its longer path of travel.

The placement of the holes in the air guide structure 401 is selected to achieve different effects. First, the vacuum force or suction or draw is the strongest right at the return opening 406, and weaker at the middle portion and end portion (adjacent the wall 414) of the return air guide. As discussed previously, without the air guide structure 401, a larger volume of air is drawn in adjacent the return opening over a given period of time than in areas further away. A reduced or small or lower number of holes is placed in the end region of the air guide structure adjacent the return opening 406 to restrict air flow through these high suction holes. Conversely, an increased or large or greater number of holes is placed in the middle and end regions of the air guide structure 401 to increase air flow. As a result, the total volume of air flow in all regions is equalized or made more equal or similar, specifically by restricting air flow in high suction regions, and increasing air flow in low suction regions. This results in more even temperature distribution and, most importantly, even baking of all pizzas or food products across the entire width of the conveyor. In at least one exemplification, the holes are each one inch in diameter. However, it should be understood that the diameter can be varied as desired to achieve different air flow characteristics.

In addition, as can be seen in FIG. 34, the number of holes or the pattern tapers somewhat from about the middle of the air guide structure 401 to the end region at the return opening 406, such that the high-suction holes near or at the return opening 406 are positioned essentially in the middle of the air guide structure 401. If the high-suction holes were instead located near the edges of the air guide structure 401, that is, at an edge 415 of the oven, they would suck in a substantial amount of cooler, outside air. As discussed above, this is undesirable. Further, since each air guide structure 401 is made identically for simplicity of manufacture and installation, either long side of the air guide structure 401 could possibly be placed near the edge 415 when installed. Consequently, no high-suction holes are placed at either long edge of the air guide structure 401. The high-suction holes near the return opening 406 are located further within the baking chamber, and therefore primarily suck in heated air to promote circulation of heated air and minimize intake of cooler air. It should be understood that the pattern of holes is not limited to the exemplifications shown in the drawings, and that virtually any pattern may be selected, provided that the general desired air flow characteristics and even baking are achieved.

Figure 35:
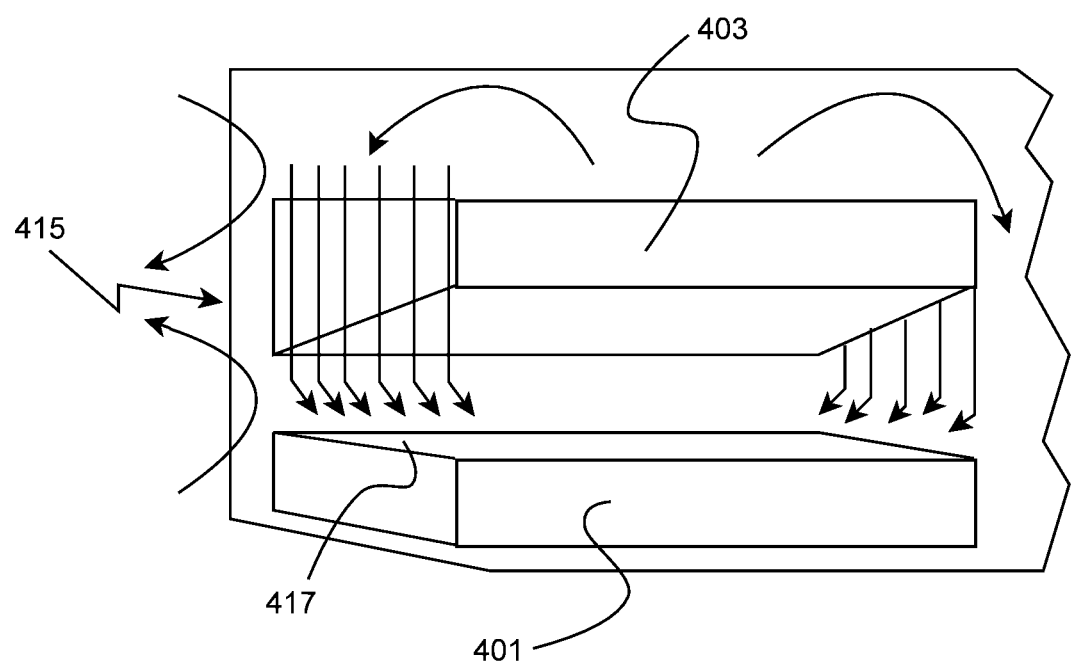

Another effect of the design of the air guide structure 401 is shown in FIG. 35. It should first be noted that this is an illustrative diagram of air flow for purposes of explanation, and should not be considered an exact representation of actual air flow in the oven. In operation, hot air flows out of the holes in the air finger assembly 403. At least a portion of this air travels around the sides of the finger assembly 403 and toward the air guide structure 401. Without the air guide structure 401, such air, due to the pressure in the oven and the force of the blower, is pushed out of the oven and into the surrounding room, which effect is generally referred to in the pizza-making industry as "blowout." Not only is this an inefficient loss of heat from inside the oven, but usually it causes an undesirable heating of the room in which the workers, and possibly some customers, are located, which can be especially uncomfortable in warmer climates. Pizzerias often therefore have to expend substantial energy costs in cooling the room to combat the heating effect of the oven. The air guide structure 401 has holes along the outer edge 417 of the air guide structure 401 to help draw the air at the edge 415 of the oven down into the air guide structure 401. As a result, less hot air escapes the oven, and more hot air is circulated back into the oven. This reduces energy costs to heat the oven since heat is conserved, and simultaneously reduces energy costs to cool the room in which the oven is located. One other substantial advantage is that the guided air forms a sort of air blade or air curtain or air wall that blocks the entry of cooler air into the oven, which cooler air, as discussed above, reduces the temperature in the oven and wastes energy in heating the air. The cooler air is therefore driven back into the room, further preventing the waste of energy, cool air, and heated air. For example, for a pizzeria operating in a warm climate like Florida, the heat produced by the oven in conjunction with the heat of the climate can be unbearable, and therefore necessitates substantial utility costs for air conditioning to cool the room. By keeping the heated air in the oven, utility costs relating to such air conditioning can be reduced by approximately 40%, which is a substantial cost savings.

The air guide structure 401 therefore achieves several advantageous and, in some ways, unexpected or surprising results that dramatically or substantially increase efficiency and reduce costs. Instead of only counteracting the cooler zone that occurs in larger ovens having a width of 44 inches or larger, the air guide structure 401: permits the use of only a single blower with a standard or less powerful motor (thereby reducing operating noise, energy costs, manufacturing costs, and maintenance costs); assists the finger assemblies 403 in evenly distributing hot air throughout the oven; increases residence time of the hot air in the oven; creates an air curtain and the open ends of the oven; helps draw hot air back into the plenum to minimize the exit of hot air out of the oven (thereby reducing energy costs substantially by conserving or recycling or circulating heated air and minimizing on/off cycles of the heater); helps promote an even draw of the return air (reducing oven "blow out" and thereby increasing oven efficiency and the evenness of the baking process); and enables substantially larger oven widths of 44 inches or more that substantially increase productivity (more food products can be cooked at the same time).

Figure 36:
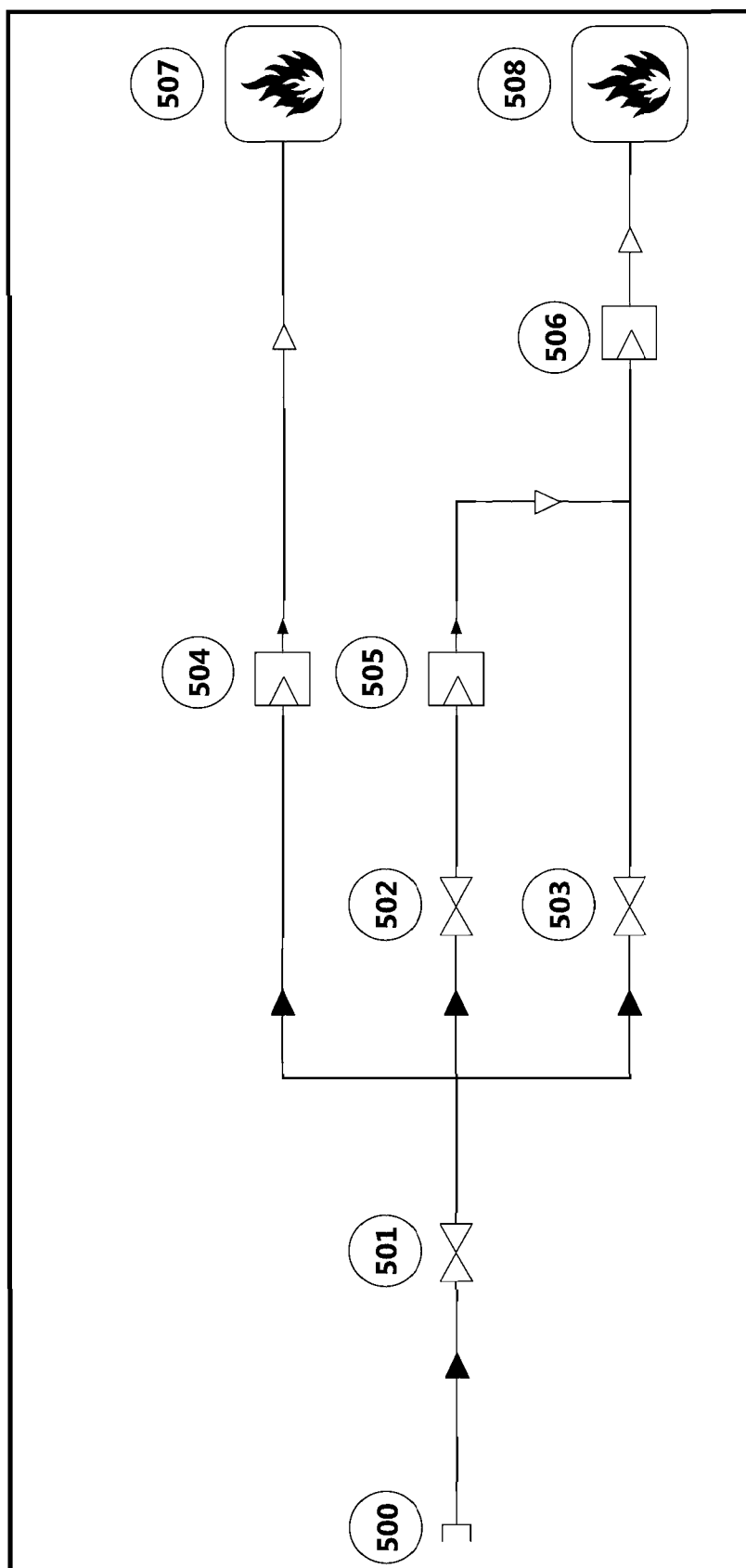
FIG. 36 shows a diagram of components of a pizza oven burner arrangement in accordance with at least one possible exemplification.

FIG. 36 shows a diagram of components of a pizza oven burner arrangement in accordance with at least one possible exemplification. Before discussing the exemplification shown, a general discussion of how on/off-style and modulating-style pizza ovens operate is necessary.

In an on/off style pizza oven, the oven can be set, usually via an electronic or computer control system, to bake at a desired baking temperature, such as, for example, 500° F. A main burner heats the air flowing through the pizza oven until the control system detects that the air temperature, such as the air temperature inside the baking chamber of the pizza oven, reaches 500° F. At that point, the high flame valve is closed and the main burner is extinguished. While the main burner is no longer lit and actively heating the air, residual heat in the baking chamber and in the oven structures continue to heat the air, thereby causing the temperature in the baking chamber to continue heating to a temperature over the desired temperature, such as to about 504° F. The oven starts to cool off until the temperature drops below 500° F. The control system detects the temperature drop and starts the ignition process to re-ignite the main burner. Unfortunately, this process takes some time, which allows the temperature to continue to drop rather quickly, if not precipitously. The temperature can drop well below the desired temperature, such as to about 493° F. to 490° F. or lower. These substantial swings in temperature can cause uneven baking, inefficient use of fuel, and a very high number of on/off cycles throughout an operating day.

To solve this problem, especially the substantial temperature drop, modulating burners were developed, wherein instead of an on/off design for the high flame valve, the high flame valve could be adjusted to regularly decrease or increase gas flow in response to increases and decreases in temperature, rather than being fully on or fully off as in the on/off system. In such a modulating system, the oven temperature could be kept very close to the desired temperature, such as +/−1° F., that is, between 499° F. and 501° F. for a 500° F. temperature. While very accurate and efficient, modulating systems are very complex and thus difficult and/or expensive to maintain.

The exemplification shown in FIG. 36 combines the mechanical simplicity of an on/off burner system with the temperature control of a modulating burner system. When the pizza oven is first started up for use from a cold state, a main gas valve 501 is opened to allow combustion gas from a gas supply 500 to flow into the gas line arrangement. Gas flows unregulated to a high flame valve 503, which is in a closed state. Gas additionally flows unregulated to a pilot orifice 504 that adjusts or regulates the flow of gas to a minimal amount sufficient to fuel a pilot flame at the pilot burner 507. Once the pilot flame is lit, the high flame valve 503 is opened to permit gas to flow to a main orifice 506 which adjusts or regulates the gas flow to a desired or predetermined amount to fuel a main burner 508. The amount of gas flow through the main orifice 506 is substantially higher than the amount of gas flow through the pilot orifice 504. The gas flowing at the main burner 508 is ignited to provide a high flame to heat the air flowing through the pizza oven. The high flame valve 503 remains open to supply gas to the main burner 508 until a desired baking temperature or temperature set point is achieved in the pizza oven. When the desired baking temperature is achieved, the high flame valve 503 is closed.

At this point, much like with the traditional on/off-style burners, the temperature would start to drop. However, unlike an on/off-style burner, a bypass arrangement is also included in the overall burner system. Going back to the startup, when the main gas valve 501 is opened, gas is also flowed unregulated to a bypass valve 502, which is also closed. Once the pilot flame is lit, the bypass valve 502 may be opened to allow gas to flow to a bypass orifice 505. The bypass orifice 505 is designed to allow a substantially lesser amount of gas to flow therethrough than the main orifice 506 is designed to allow through.

During heating of the oven to the desired temperature, both the high flame valve 503 and the bypass valve 502 are opened and the gas flows to the main orifice 506. When the desired temperature is reached, the high flame valve 503 is closed, but the bypass valve 502 remains open. A reduced amount of gas flows out of the bypass orifice 505 and to the main burner 508. Instead of a high flame burning at the main burner 508 due to a full supply of gas flowing through the high flame valve, a lower flame burns at the main burner 508 due to the reduced amount of gas flowing from the bypass orifice 505. As a result, the oven temperature drops at a much slower rate as the lower flame provides supplemental heat that is insufficient to maintain the desired temperature, but can function as a buffer of sorts to prevent a fast or precipitous drop in oven temperature. In this manner, the oven temperature falls much more slowly, thereby maintaining the oven temperature at approximately the desired level for a longer period of time than was possible in an on/off burner system. By delaying the temperature drop, the on/off cycles can be substantially reduced, such as by half. Therefore, if there are 100 on/off cycles in a day, those can be reduced by 50 or more. Accordingly, less fuel will need to be combusted to maintain heat in the oven, thereby increasing operating efficiency. The temperature on heating up therefore exceeds the desired temperature by 3-4° F. at most, and on cooling down drops below the desired temperature by only about 1° F. Again, heat is not lost as quickly due to the lower, supplemental heat provided via the bypass orifice 505, so when the high flame valve 503 is opened to generate more heat and raise the oven temperature, the oven temperature can quickly be restored to the desired temperature.

It should be noted that the bypass valve 502 is always open if the desired baking temperature is above the minimum oven temperature that can be achieved by the gas allowed through the bypass orifice 505 alone. To further explain, the bypass orifice 505 allows a reduced flow of gas that will produce a low or lower flame at the main burner 508. Such a low or lower flame can generate enough heat to maintain the oven at a temperature of, for example 300° F. or 350° F., depending on the design of the bypass arrangement and the oven. If the desired baking temperature is 500° F., then the bypass valve 502 will always be open during operation of the oven. However, sometimes an oven user will want to cook or bake multiple different types of products. While a baking temperature of 450° F. or 500° F. may be suitable for pizza, it is not suitable for tasks that require lower temperatures, such as melting cheese on a warm sandwich or similar product, baking cookies or pastries, or simply warming dining plates in order to keep the food thereon warm while eaten by a customer. These and other tasks are common to restaurants and pizza shops. If there is no bypass valve 502 in the gas line, such as in the gas line to the pilot burner 507, or if the bypass valve 502 is always open when the oven is in operation, the oven cannot be run at such lower temperatures. Therefore, in at least one possible exemplification, if the desired oven temperature is set at a temperature, such as 150° F., that is below the minimum temperature or set point for operation of the bypass arrangement, such as 350° F., the bypass valve 502 stays closed and only the high flame valve 503 is open. In this scenario, the oven will operate much like a traditional on/off style oven. While not the most accurate and/or efficient way to operate an oven, as discussed above, the user will now be able to use the oven for a plurality of different heating tasks.

In summary, the bypass arrangement coupled with the on/off-style main heating arrangement provides the precise temperature control provided by modulating burners, but without the need for complex control systems and components. Such a system is easier and more cost-effective to maintain than a modulating burner, but more efficient than traditional on/off-style burners.

In at least one possible exemplification, the operation of the pizza oven conveyor arrangement can be monitored in order to minimize or prevent damage to the conveyor arrangement due to foreign objects becoming jammed in the conveyor belt. A monitoring arrangement controlled by an electronic control system can monitor different parameters of the conveyor arrangement, such as the revolutions per minute (RPM) of the conveyor motor. If the RPM's are detected at an undesirable level indicative of a conveyor belt jam, the conveyor motor can be automatically shut down to stop the application of a drive force on the conveyor belt, which thereby prevents or minimizes long-term and irreversible damage to the conveyor arrangement. The monitoring arrangement could also monitor other parameters, such as the movement of the conveyor belt or the presence of a foreign object in the conveyor belt. A worker can be notified by the control system that a conveyor belt jam has been detected. The worker must remove the obstruction before the control system will allow the conveyor arrangement to resume operation.

It should be understood that all of the systems and components disclosed herein relating to the design and/or operation of a pizza oven can be used individually or in any combination thereof in a single pizza oven system.

An example of a pizza oven that includes or can be adapted to include at least one or more of the pizza oven components according to at least one possible exemplification disclosed herein, is the Edge Oven, manufactured and/or sold by MF&B Restaurant Systems, Inc., of 133 ICMI Rd, Dunbar, Pa., USA 15431. An example of an air guide and flow control arrangement and components thereof that be used or adapted for use in at least one possible exemplification disclosed herein, is the Return Air Management (R.A.M.) system, manufactured and/or sold by MF&B Restaurant Systems, Inc., of 133 ICMI Rd, Dunbar, Pa., USA 15431. Some examples of burners that can be used or adapted for use in at least one possible exemplification disclosed herein are the P265 series of modulating burners manufactured and/or sold by Wayne Combustion Systems, 801 Glasgow Ave, Fort Wayne, Ind., USA 46803. An example of a flame sensor or flame detection device that can be used or adapted for use in at least one possible exemplification disclosed herein is the KLC-20 or KLC-2002 compact flame controller manufactured and/or sold by BST Solutions GmbH, Ruegenstrasse 7, 42579 Heiligenhaus, Germany. According to at least one possible exemplification, an existing burner arrangement, such as the P265 series burner, can be adapted or retrofitted with a flame detection arrangement, such as the KLC-20 compact flame controller, by milling or cutting an opening in a sidewall of the burner housing. The flame detection arrangement can be mounted or held on the sidewall of the burner housing in a manner described herein. The flame detection arrangement can be oriented so as to have a line of sight through the opening in the sidewall to a flame coming from a burner unit housed in the burner housing.

An example of a control system program for a pizza oven control system that can be used or adapted for use in at least one possible exemplification disclosed herein is the iHEAT control software v63 developed by Wayne Combustion Systems, 801 Glasgow Ave, Fort Wayne, Ind., USA 46803, to comply with European Standard EN298:2012-11. This standard requires that burner management control units make a "no-flame" check when the flame amplifier is permanently energized for 24 hours or continuous burner running time. iHEAT v63 incorporates the function of a 24-hour timer and power cycles the flame detection arrangement to ensure this requirement in meet. An example of a control system for controlling various functions and operating parameters of a conveyor pizza oven, which can be used or adapted for use in at least one possible exemplification disclosed herein, is a control system available from MF&B Restaurant Systems, Inc., of 133 ICMI Rd, Dunbar, Pa., USA 15431. The control system capabilities include: touch sensitive control, compatibility across modulating and standard/by-pass combustion systems, custom recipes, 30 recipe capacity, recipe names (up to eight characters), baking time(s), baking temperature, circulation blower speed with frequency drive models, recipe menu custom password protection, oven to oven recipe transfer (via USB flash drive), advanced serviceability and prevention, belt damage protection, advanced alarm and fault detection, critical systems monitoring, induction blower motor speed monitoring for standard and/or by-pass systems, over temperature prevention, system voltage monitoring, conveyor demand monitoring, iHEAT integration, logging of historical diagnostic information, ETL (extract, transform, load) testing, and compliance with EN 60730-1:2016.

In at least one possible exemplification, the equipment employed to ignite and control the combustion of the gaseous fuel source may possibly comprise gas flow regulation valves, temperature monitoring and control devices, and safety assurance devices.

The gas flow regulation valves are the primary gas control devices. The independent valves are the primary/pilot, the main/high flame, and the by-pass. These devices are housed within a single molded body assembly and are independently controlled. The main valve, in conjunction with the main orifice, is configured using mechanical adjustment to create a minimum flow rate and a maximum flow rate of gas, whereby fixing the minimum and maximum BTU/Hr rate of the combustion system.

The temperature monitoring and control device according to at least one possible exemplification of the conveyor oven utilizes a single type-J thermocouple, a control system, CV valve, and in modulating systems, the iHEAT control module. Temperature is measured using the thermocouple and a control system. This temperature is used by the control system to adjust the output voltage to the high flame valve in the by-pass combustion system. By-pass output may also be cycled, depending on the measured temperature and the configuration of the control system. Modulating systems utilize a second device, the iHEAT control module. The iHEAT control module utilizes a 4-20 mA loop, generated by the control system. This loop directly correlates to the perceived temperature difference between measured and target temperatures (set-point). The iHEAT control module is inter-connected to the control system via an independent UART network, allowing diagnostic and status information to be passed off for the purposes of: system health, system status, and general diagnostics.

The safety assurance devices of the oven ensure specific condition are correct and within limits of operation prior to ignition and during operation. The most basic of these safety devices includes a centrifugal switch in the main circulation motor. This is also the first safety check performed by the oven. This check ensures the circulation motor is turning and if all mechanical aspects are correct and air is moving within the oven. If the returning power from the centrifugal switch is not present, the oven burner cannot be powered. Some ovens with variable frequency drives are equipped with an air switch and not a centrifugal switch, but the purpose and function are the same. A modulating system performs the following tests by means of the iHEAT control module: main CV valve is present and responding, induction blower motor is rotating at correct speed, signal is within the expected range from the control system, and 24 VDC is present. If these conditions are not as expected, the burner will not be powered. In a by-pass system, the CV valve, induction blower, and 24V system are monitored by the control system. If the CV valves are not detected and responding, if the induction blower is not within rotation expectation, or if the 24V system is outside of specification, the combustion system will cease to operate. Both the modulating and by-pass systems utilize an ignition module. The ignition module performs a verification of combustion by means of a flame signal. This flame signal must remain within the design limits in order for the primary/pilot valve to remain open. The flame signal is generated by either flame rectification, a process that involves free ion flow through the flame from the flame rod/electrode to the burner venture (chassis ground), or by optical detection, a process by which a detector analyzes the light emitted by the flame and subsequently produces an equivalent flame signal. Due to the levels of aldehyde and silica that develop during normal combustion, optical detection is more sustainable over time. The optical detector can have a self-test feature that is activated during start-up. Using such a device as a "proof of flame" imposes additional safety requirements which are addressed by the iHEAT control module. In at least one possible exemplification, in order to ensure the oven remains safe during continuous operation and that the detector can perform the self-test at a minimum 24-hour interval, the iHEAT control module will momentarily cycle the power to the ignition module and the optical detector. This is a requirement of the European Standards EN298:2012-11. As the optical detector initializes, this self-diagnostic test may be performed. During operation, the temperature is monitored by the control system. In the event a failure may cause the temperature to enter a "runaway" condition, the control system will detect the fault and power down the burner system. Additional counter-measures are ensured in a modulating system. The iHEAT control module will detect a "no call for heat" condition, meaning the measured temperature is above the requested temperature. This will result in a burner system power cycle if the condition exists for about 45 seconds. The resulting drop in temperature, due to the burner system power cycle, ensures the oven does not over temperature.

In at least one exemplification of the present disclosure, a pizza oven comprises a top panel being configured to be disposed to form a top of a baking chamber; a bottom panel being configured to be disposed to form a bottom of the baking chamber opposite said top panel; a first side panel being configured to be disposed to form a first side of the baking chamber; a second side panel being configured to be disposed to form a second side of the baking chamber; a plenum arrangement comprising a gas burner in a housing, a hot air blower motor, and a fan; said plenum arrangement being configured and disposed to supply heat into the baking chamber; a conveyor belt configured to convey pizzas through said baking chamber; a control assembly being configured to be in electrical communication with said plenum arrangement; a conveyor motor being configured to drive said conveyor belt; a burner assembly comprising a gas burner housed in a burner housing and being configured to heat air in said pizza oven; said gas burner comprising a longitudinal axis along which air is configured to flow through said gas burner; an opening in said burner housing; a sensor held on an exterior of said burner housing; wherein said sensor is held to directly sense a flame to be emitted from said gas burner; said sensor comprising a longitudinal axis which is disposed to have a non-zero acute angle with respect to said longitudinal axis along which air is configured to flow through said gas burner; said sensor has a line of unobstructed sight, through the air, to the flame to be emitted from said gas burner, through said opening in said burner housing; said sensor being in electronic communication with said control assembly; said control assembly being configured to control the operation of said conveyor motor, said gas burner, said hot air blower motor, said fan, and gas flow to said gas burner.

In at least one other exemplification of the present disclosure, a method of operating a pizza oven comprises the steps of: activating a control system and sending out control signals from said control system to turn on a gas burner and emit a flame from the gas burner; directly sensing the flame being emitted from the gas burner, with a sensor; sending a signal from said sensor to said control system; heating air with said gas burner; blowing heated air into said pizza oven with a fan; and conveying uncooked pizzas through said pizza oven and baking said pizzas.

In at least one further exemplification of the present disclosure, a pizza oven comprises: a pizza baking chamber comprising an outer wall disposed to form a pizza baking chamber; a gas burner comprising a longitudinal axis which is configured to flow heated air along said longitudinal axis; said gas burner being in heat transfer communication with said pizza baking chamber; said gas burner comprising an opening in a sidewall thereof; a sensor held on an exterior of said sidewall of said gas burner; and said sensor comprising a longitudinal axis which is disposed to have a non-zero acute angle, with respect to said longitudinal axis of said gas burner, and has a line of sight to the flame to be emitted from said gas burner, through said opening in said gas burner.

One feature or aspect of an exemplification is believed at the time of the filing of this patent application to possibly reside broadly in a modular pizza oven kit comprising: a plurality of pizza oven components comprising: a base panel; a plurality of casters being configured to be detachably connected to said base panel to support said base panel on a floor surface; a top panel being configured to be disposed to form a top of a bake chamber; a bottom panel being configured to be disposed to form a bottom of a bake chamber opposite said top panel; a side panel being configured to be disposed to form a first side of a bake chamber; a plenum arrangement being configured to be disposed to form a second side of a bake chamber opposite said first side; said plenum arrangement comprising a housing and a hot air blower motor and fan being disposed in said housing; said top panel, said bottom panel, said first side panel, and said plenum arrangement being configured to be detachably connected together to form an open-ended bake chamber; said bake chamber being configured to be detachably connected to and supported on said base panel; a conveyor belt being configured to be detachably connected inside said bake chamber with first and second end portions of said conveyor belt projecting out of the open ends of said bake chamber; a plurality of finger assemblies being configured to be detachably connected inside the bake chamber and to direct heated air toward a product to be baked on said conveyor belt; two top end panels being configured to be detachably connected to said side panel and said plenum arrangement to close the upper portion of the open ends of said bake chamber above said conveyor belt; two bottom end panels being configured to be detachably connected to said side panel and said plenum arrangement to close the lower portion of the open ends of said bake chamber the low said conveyor belt; a control can assembly being configured to be detachably connected to at least said plenum arrangement; a conveyor motor being configured to drive said conveyor; a burner assembly being configured to heat air; each of said conveyor motor and said burner assembly being disposed in said control can assembly; and said control can assembly being configured to control the operation of said conveyor motor, said burner assembly, and said hot air blower motor and fan; a plurality of fastening devices comprising at least one of bolts and screws being configured to detachably connect pizza oven components; and a plurality of alignment pins being configured to temporarily connect and align pizza oven components to permit accurate connection of pizza oven components with said fastening devices.

Another feature or aspect of an exemplification is believed at the time of the filing of this patent application to possibly reside broadly in a pizza oven finger assembly being configured to be connected to a hole in a plenum of a pizza oven to receive and guide heated air from the plenum toward a product to be baked in a pizza oven, said finger assembly comprising: a housing comprising a first side portion, a second side portion, and a third side portion, said first side portion being disposed to connect said second side portion and said third side portion; each of said second and third side portions being disposed perpendicular to said first side portion; an outer cover panel being matingly and sealingly engaged with said housing; an inner panel being disposed between said housing and said outer cover panel; each of said outer cover panel and said inner panel having holes disposed therein to guide heated air there through; a finger holder being configured to be fastened to a side wall of a pizza oven opposite a plenum of a pizza oven; said finger holder comprising: two arm sections; a support section being disposed perpendicular to and to connect said arm sections; and a flange section being disposed to project from said support section at an angle greater than 90°; and said flange section being configured to produce, upon installation of said pizza oven finger assembly in a pizza oven, a biasing or pressing force on at least one of said outer cover panel and said housing to press and hold at least one of said outer cover panel in said housing sealingly against a plenum wall of a pizza oven to minimize leakage of heated air through a gap between the plenum wall and said pizza oven finger assembly.

Yet another feature or aspect of an exemplification is believed at the time of the filing of this patent application to possibly reside broadly in a two-speed pizza oven comprising: a base support; a top panel being disposed to form a top of a bake chamber; a bottom panel being disposed to form a bottom of a bake chamber opposite said top panel; a side panel being disposed to form a first side of a bake chamber; a plenum arrangement being disposed to form a second side of a bake chamber opposite said first side; said plenum arrangement comprising a housing and a hot air blower motor and fan being disposed in said housing; said top panel, said bottom panel, said first side panel, and said plenum arrangement being configured to be connected together to form an open-ended bake chamber; said bake chamber being configured to be connected to and supported on said base panel; a conveyor belt being configured to be connected inside said bake chamber with first and second end portions of said conveyor belt projecting out of the open ends of said bake chamber; a plurality of finger assemblies being connected inside the bake chamber and being configured to direct heated air toward a product to be baked on said conveyor belt; two top end panels being detachably connected to said side panel and said plenum arrangement to close the upper portion of the open ends of said bake chamber above said conveyor belt; two bottom end panels being detachably connected to said side panel and said plenum arrangement to close the lower portion of the open ends of said bake chamber the low said conveyor belt; a control can assembly being connected to at least said plenum arrangement; a conveyor motor being configured to drive said conveyor; a burner assembly being configured to heat air; each of said conveyor motor and said burner assembly being disposed in said control can assembly; said control can assembly being configured to control the operation of said conveyor motor, said burner assembly, and said hot air blower motor and fan; said control can assembly comprising a control arrangement being configured to: switch the speed of said conveyor motor between at least a first speed and a second speed lower than said first speed; switch the output of said burner assembly between at least a first heating level and a second heating level lower than said first heating level; and switch the speed of said blower motor between at least a first speed and a second speed lower than said first speed.

A further feature or aspect of an exemplification is believed at the time of the filing of this patent application to possibly reside broadly in a method of operating a two-speed pizza oven, said method comprising the steps of: baking a first product at a first pizza oven energy level, said step of baking the first product comprising: moving a conveyor at a first conveyor speed; heating air with a burner assembly at a first heating level; and blowing heated air at a first air speed with a fan rotating at a first rotational speed; choosing to bake a second product at a second pizza oven energy level different from the first pizza oven energy level; pressing a toggle switch on a control system and sending out control signals from said control system to bake a second product at a second pizza oven energy level different from the first pizza oven energy level; baking a second product at a second pizza oven energy level different from the first pizza oven energy level, said step of baking the second product comprising: switching the operating speed of the conveyor motor to move the conveyor at a second conveyor speed different from said first conveyor speed; switching the operating level of the burner assembly to heat air at a second heating level different from said first heating level; and switching the operating speed of a fan motor to rotate the fan at a second rotational speed different from said first rotational speed to blow heated air at a second air speed different from said first air speed.

Another feature or aspect of an exemplification is believed at the time of the filing of this patent application to possibly reside broadly in a pizza oven comprising: a top panel being configured to be disposed to form a top of a baking chamber; a bottom panel being configured to be disposed to form a bottom of the baking chamber opposite said top panel; a first side panel being configured to be disposed to form a first side of the baking chamber; a second side panel being configured to be disposed to form a second side of the baking chamber; a plenum arrangement comprising a gas burner in a housing, a hot air blower motor, and a fan; said plenum arrangement being configured and disposed to supply heat into the baking chamber; a conveyor belt configured to convey pizzas through said baking chamber; a control assembly being configured to be in electrical communication with said plenum arrangement; a conveyor motor being configured to drive said conveyor belt; a burner assembly comprising a gas burner housed in a burner housing and being configured to heat air in said pizza oven; said gas burner comprising a longitudinal axis along which air is configured to flow through said gas burner; an opening in said burner housing; a sensor held on an exterior of said burner housing; wherein said sensor is held to directly sense a flame to be emitted from said gas burner; said sensor comprising a longitudinal axis which is disposed to have a non-zero acute angle with respect to said longitudinal axis along which air is configured to flow through said gas burner; said sensor has a line of unobstructed sight, through the air, to the flame to be emitted from said gas burner, through said opening in said burner housing; said sensor being in electronic communication with said control assembly; said control assembly being configured to control the operation of said conveyor motor, said gas burner, said hot air blower motor, said fan, and gas flow to said gas burner.

Yet another feature or aspect of an exemplification is believed at the time of the filing of this patent application to possibly reside broadly in the pizza oven further comprising a mounting bracket extending outward from said burner housing, said mounting bracket comprising a sensor mounting wall for mounting said sensor and have said longitudinal axis of said sensor perpendicular with said sensor mounting wall of said mounting bracket.

Still another feature or aspect of an exemplification is believed at the time of the filing of this patent application to possibly reside broadly in the pizza oven wherein said mounting bracket is vented.

A further feature or aspect of an exemplification is believed at the time of the filing of this patent application to possibly reside broadly in the pizza oven wherein said sensor mounting wall is configured for mounting said sensor with said longitudinal axis of said sensor between about 15° and 35° with respect to said longitudinal axis along which air is configured to flow through said gas burner.

Another feature or aspect of an exemplification is believed at the time of the filing of this patent application to possibly reside broadly in the pizza oven wherein said sensor mounting wall is configured for mounting said sensor with said longitudinal axis of said sensor about 25° with respect to said longitudinal axis along which air is configured to flow through said gas burner.

Yet another feature or aspect of an exemplification is believed at the time of the filing of this patent application to possibly reside broadly in the pizza oven wherein said sensor is an optical sensor configured to optically sense a flame, or no flame, being emitted from said gas burner.

One feature or aspect of an exemplification is believed at the time of the filing of this patent application to possibly reside broadly in the pizza oven wherein said control assembly is configured to control gas flow to said burner in response to the sensed flame or no flame being emitted from said gas burner.

Another feature or aspect of an exemplification is believed at the time of the filing of this patent application to possibly reside broadly in method of operating said pizza oven of claim 1, said method comprising the steps of: activating a control system and sending out control signals from said control system to turn on a gas burner and emit a flame from the gas burner; directly sensing the flame being emitted from the gas burner, with a sensor; sending a signal from said sensor to said control system; heating air with said gas burner; blowing heated air into said pizza oven with a fan; and conveying uncooked pizzas through said pizza oven and baking said pizzas.

Yet another feature or aspect of an exemplification is believed at the time of the filing of this patent application to possibly reside broadly in the method of operating said pizza oven, wherein said step of directly sensing the flame being emitted from said gas burner comprises sensing a flame or no flame being emitted from said gas burner throughout the operation of said pizza oven.

Still another feature or aspect of an exemplification is believed at the time of the filing of this patent application to possibly reside broadly in the method of operating said pizza oven further comprising a step of controlling gas flow to said gas burner, with said control system, in response to the sensed flame or no flame.

A further feature or aspect of an exemplification is believed at the time of the filing of this patent application to possibly reside broadly in a pizza oven comprising: a pizza baking chamber comprising an outer wall disposed to form a pizza baking chamber; a gas burner comprising a longitudinal axis which is configured to flow heated air along said longitudinal axis; said gas burner being in heat transfer communication with said pizza baking chamber; said gas burner comprising an opening in a sidewall thereof; a sensor held on an exterior of said sidewall of said gas burner; and said sensor comprising a longitudinal axis which is disposed to have a non-zero acute angle, with respect to said longitudinal axis of said gas burner, and has a line of sight to the flame to be emitted from said gas burner, through said opening in said gas burner.

Another feature or aspect of an exemplification is believed at the time of the filing of this patent application to possibly reside broadly in the pizza oven further comprising a mounting bracket extending outward from said gas burner, said mounting bracket comprising a sensor mounting wall for mounting said sensor and have said longitudinal axis of said sensor perpendicular with said sensor mounting wall of said mounting bracket.

Yet another feature or aspect of an exemplification is believed at the time of the filing of this patent application to possibly reside broadly in the pizza oven wherein said mounting bracket is vented.

Still another feature or aspect of an exemplification is believed at the time of the filing of this patent application to possibly reside broadly in the pizza oven wherein said sensor mounting wall is configured for mounting said sensor with said longitudinal axis of said sensor between about 15° and 35° with respect to said longitudinal axis along which air is configured to flow through said gas burner.

A further feature or aspect of an exemplification is believed at the time of the filing of this patent application to possibly reside broadly in the pizza oven wherein said sensor mounting wall is configured for mounting said sensor with said longitudinal axis of said sensor about 25° with respect to said longitudinal axis along which air is configured to flow through said gas burner.

Another feature or aspect of an exemplification is believed at the time of the filing of this patent application to possibly reside broadly in the pizza oven wherein said sensor is an optical sensor configured to optically sense a flame, or no flame, being emitted from said gas burner.

Yet another feature or aspect of an exemplification is believed at the time of the filing of this patent application to possibly reside broadly in the pizza oven wherein said control assembly is configured to control gas flow to said gas burner in response to the sensed flame or no flame being emitted from said gas burner.

The components disclosed in the various publications, disclosed or incorporated by reference herein, may possibly be used in possible exemplifications of the present invention, as well as equivalents thereof.

The purpose of the statements about the technical field is generally to enable the Patent and Trademark Office and the public to determine quickly, from a cursory inspection, the nature of this patent application. The description of the technical field is believed, at the time of the filing of this patent application, to adequately describe the technical field of this patent application. However, the description of the technical field may not be completely applicable to the claims as originally filed in this patent application, as amended during prosecution of this patent application, and as ultimately allowed in any patent issuing from this patent application. Therefore, any statements made relating to the technical field are not intended to limit the claims in any manner and should not be interpreted as limiting the claims in any manner.

The appended drawings in their entirety, including all dimensions, proportions and/or shapes in at least one exemplification of the invention, are accurate and are hereby included by reference into this specification.

The background information is believed, at the time of the filing of this patent application, to adequately provide background information for this patent application. However, the background information may not be completely applicable to the claims as originally filed in this patent application, as amended during prosecution of this patent application, and as ultimately allowed in any patent issuing from this patent application. Therefore, any statements made relating to the background information are not intended to limit the claims in any manner and should not be interpreted as limiting the claims in any manner.

All, or substantially all, of the components and methods of the various exemplifications may be used with at least one exemplification or all of the exemplifications, if more than one exemplification is described herein.

The purpose of the statements about the object or objects is generally to enable the Patent and Trademark Office and the public to determine quickly, from a cursory inspection, the nature of this patent application. The description of the object or objects is believed, at the time of the filing of this patent application, to adequately describe the object or objects of this patent application. However, the description of the object or objects may not be completely applicable to the claims as originally filed in this patent application, as amended during prosecution of this patent application, and as ultimately allowed in any patent issuing from this patent application. Therefore, any statements made relating to the object or objects are not intended to limit the claims in any manner and should not be interpreted as limiting the claims in any manner.

All of the patents, patent applications and publications recited herein, and in the Declaration attached hereto, are hereby incorporated by reference as if set forth in their entirety herein.

The summary is believed, at the time of the filing of this patent application, to adequately summarize this patent application. However, portions or all of the information contained in the summary may not be completely applicable to the claims as originally filed in this patent application, as amended during prosecution of this patent application, and as ultimately allowed in any patent issuing from this patent application. Therefore, any statements made relating to the summary are not intended to limit the claims in any manner and should not be interpreted as limiting the claims in any manner.

It will be understood that any or all the examples of patents, published patent applications, and other documents which are included in this application and including those which are referred to in paragraphs which state "Some examples of . . . which may possibly be used in at least one possible exemplification of the present application . . . " may possibly not be used or useable in any one or more or any exemplifications of the application.

The sentence immediately above relates to patents, published patent applications and other documents either incorporated by reference or not incorporated by reference.

U.S. Pat. No. 8,093,533, entitled "MODULAR PIZZA OVEN KIT, PIZZA OVEN FINGER ASSEMBLY SUPPORT, AND A METHOD OF OPERATING A PIZZA OVEN AT DIFFERENT SPEEDS AND A CONTROL ARRANGEMENT FOR PERFORMING THE METHOD", issued Jan. 10, 2012, and all of the patents, patent applications or patent publications, which were cited therein, and/or cited elsewhere, are hereby incorporated by reference as if set forth in their entirety herein as follows: U.S. Pat. No. 6,933,773 to Henke, et al., and U.S. Pat. No. 6,998,582 to Maroti. U.S. provisional patent application 62/659,852, filed Apr. 19, 2018, is also incorporated by reference as if set forth in its entirety herein. Some examples of oven technology that may possibly be utilized or adapted for use in at least one possible exemplification may possibly be found in U.S. Pat. No. 8,776,773, entitled "Air Impingement Tunnel Oven," which is incorporated by reference as if set forth in its entirety herein.

The purpose of incorporating U.S. patents, Foreign patents, publications, etc. is solely to provide additional information relating to technical features of one or more exemplifications, which information may not be completely disclosed in the wording in the pages of this application. Words relating to the opinions and judgments of the author and not directly relating to the technical details of the description of the exemplifications therein are not incorporated by reference. The words all, always, absolutely, consistently, preferably, guarantee, particularly, constantly, ensure, necessarily, immediately, endlessly, avoid, exactly, continually, expediently, need, must, only, perpetual, precise, perfect, require, requisite, simultaneous, total, unavoidable, and unnecessary, or words substantially equivalent to the above-mentioned words in this sentence, when not used to describe technical features of one or more exemplifications, are not considered to be incorporated by reference herein.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

The description of the exemplification or exemplifications is believed, at the time of the filing of this patent application, to adequately describe the exemplification or exemplifications of this patent application. However, portions of the description of the exemplification or exemplifications may not be completely applicable to the claims as originally filed in this patent application, as amended during prosecution of this patent application, and as ultimately allowed in any patent issuing from this patent application. Therefore, any statements made relating to the exemplification or exemplifications are not intended to limit the claims in any manner and should not be interpreted as limiting the claims in any manner.

The details in the patents, patent applications and publications may be considered to be incorporable, at applicant's option, into the claims during prosecution as further limitations in the claims to patentably distinguish any amended claims from any applied prior art.

The purpose of the title of this patent application is generally to enable the Patent and Trademark Office and the public to determine quickly, from a cursory inspection, the nature of this patent application. The title is believed, at the time of the filing of this patent application, to adequately reflect the general nature of this patent application. However, the title may not be completely applicable to the technical field, the object or objects, the summary, the description of the exemplification or exemplifications, and the claims as originally filed in this patent application, as amended during prosecution of this patent application, and as ultimately allowed in any patent issuing from this patent application. Therefore, the title is not intended to limit the claims in any manner and should not be interpreted as limiting the claims in any manner.

The abstract of the disclosure is submitted herewith as required by 37 C.F.R. § 1.72(b). As stated in 37 C.F.R. § 1.72(b): A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure. The abstract shall not be used for interpreting the scope of the claims.

Therefore, any statements made relating to the abstract are not intended to limit the claims in any manner and should not be interpreted as limiting the claims in any manner.

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

While various aspects and exemplifications have been disclosed herein, other aspects and exemplifications are contemplated. The various aspects and exemplifications disclosed herein are for purposes of illustration and not intended to be limiting. Additionally, the words "including," "having," and variants thereof (e.g., "includes" and "has") as used herein, including the claims, shall be open-ended and have the same meaning as the word "comprising" and variants thereof (e.g., "comprise" and "comprises").

The exemplifications of the invention described herein above in the context of the preferred exemplifications are not to be taken as limiting the exemplifications of the invention to all of the provided details thereof, since modifications and variations thereof may be made without departing from the spirit and scope of the exemplifications of the invention.

What is claimed is:

1. A pizza oven comprising:
    a pizza baking chamber comprising:
        a top panel;
        a bottom panel being disposed opposite said top panel;
        a first side panel being disposed transverse or perpendicular to said top panel and said bottom panel;
        a second side panel being disposed opposite said first side panel, and being disposed transverse or perpendicular to said top panel and said bottom panel; and
        entry and exit openings being configured to permit insertion of uncooked pizza into said baking chamber, and removal of cooked pizza out of said baking chamber;
    a conveyor belt being configured and disposed to convey pizzas and food products through said baking chamber;
    a pizza oven heater comprising a burner, a blower motor, and a fan;
    said pizza oven heater being configured to heat and assist in circulating air to produce a desired air temperature in said baking chamber sufficient to cook or bake food products in said baking chamber;
    a plenum disposed behind said first side panel;
    said first side panel comprising a plurality of input openings disposed to connect the interior of said plenum to the interior of said baking chamber to permit flow of heated air into said baking chamber;
    said first side panel comprising a plurality of return openings disposed to connect the interior of said baking chamber to the interior of said plenum to permit flow of return air into said plenum;
    a plurality of finger assemblies being disposed in said baking chamber;
    each of said finger assemblies comprising a housing that defines an air chamber with an open end;
    said open end of each of said finger assemblies being connected to a corresponding one of said input openings to permit flow of heated air from said plenum into said finger assemblies via said input openings;
    each housing of said finger assemblies comprising a planar surface disposed facing toward a top or bottom surface of said conveyor belt;
    said planar surface of each of said finger assemblies comprising a plurality of output openings therein being configured to emit heated air in a direction toward said conveyor belt to disperse heated air throughout said baking chamber;
    said burner comprising a burner housing having a cylindrical or tubular shape with a central longitudinal axis;
    said burner comprising a gas tube disposed within said burner housing;
    said gas tube comprising an input end and an output end;
    said gas tube being configured to receive combustible gas in said input end;
    said gas tube being configured to guide combustible gas therethrough to said output end;

said burner comprising an ignition device disposed at said output end of said burner;

said ignition device being configured to ignite combustible gas flowing out of said gas tube to create a flame at said output end of said burner;

said burner comprising a flame detection device;

said burner comprising a mounting bracket mounted on an outside surface of said burner housing;

said flame detection device being removably mounted in said mounting bracket;

said mounting bracket comprising an angled wall disposed at an angle with respect to the central longitudinal axis of said burner housing;

said angled wall being configured and disposed to orient said flame detection device with respect to a flame at said output end of said burner;

said flame detection device being elongated and having a device axis along the length thereof;

said flame detection device being mounted in said mounting bracket such that said device axis of said flame detection device is essentially perpendicular to said angled wall of said mounting bracket and at an acute angle to the central longitudinal axis of said burner housing;

said burner housing comprising an opening therein in the form of an elongated slot;

said opening being configured and disposed to permit said flame detection device to be disposed at said angle to the central longitudinal axis of said burner housing and to detect a flame at said output end of said burner;

said flame detection device is disposed in said mounting bracket such that all of said flame detection device is disposed outside of said burner housing;

said flame detection device comprises a first end portion and a second end portion, wherein said first end portion is disposed further away from said burner housing than said second end portion;

said second end portion comprises a flame detector component disposed to face toward a flame at said output end of said burner;

said second end portion is disposed at said elongated slot such that all of said flame detector component is disposed outside of said burner housing; and said angled wall of said mounting bracket comprising an opening therein configured to permit partial insertion of said flame detection device inside said mounting bracket, such that said second end portion is disposed inside of said mounting bracket and said first end portion is disposed outside of said mounting bracket.

2. The pizza oven according to claim 1, wherein:

said mounting bracket is box-shaped with an open end;

said mounting bracket is configured and disposed to cover said elongated slot in said burner housing; and said elongated slot and said mounting bracket are disposed at a middle portion of said burner housing along the length of said burner housing.

3. The pizza oven according to claim 2, wherein said angle at which said device axis is disposed with respect to the central longitudinal axis of said burner housing is one of (A) and (B):

(A) in the range of fifteen degrees to thirty-five degrees; and (B) in the range of twenty-five degrees to thirty degrees.

4. A pizza oven comprising:

a pizza baking chamber configured to contain heated air to cook pizzas therein;

a conveyor belt being configured and disposed to convey pizzas and food products through said baking chamber;

a pizza oven heater comprising a burner, a blower motor, and a fan;

said pizza oven heater being configured to heat air and assist in circulating air to produce a desired air temperature in said baking chamber sufficient to cook or bake food products in said baking chamber;

a plenum disposed outside of said pizza baking chamber;

a plurality of input openings and return openings disposed in a wall of said pizza baking chamber to connect the interior of said pizza baking chamber to the interior of said plenum to permit circulating flow of air between said plenum and said pizza baking chamber;

said burner comprising a burner housing having a cylindrical or tubular shape with a central longitudinal axis;

said burner comprising a gas tube disposed within said burner housing;

said gas tube comprising an input end and an output end;

said gas tube being configured to receive combustible gas in said input end;

said gas tube being configured to guide combustible gas therethrough to said output end;

said burner comprising an ignition device disposed at said output end of said burner;

said ignition device being configured to ignite combustible gas flowing out of said gas tube to create a flame at said output end of said burner;

said burner comprising a flame detection device;

said burner comprising a mounting bracket mounted on an outside surface of said burner housing;

said flame detection device being removably mounted in said mounting bracket;

said mounting bracket comprising an angled wall disposed at an angle with respect to the central longitudinal axis of said burner housing;

said angled wall being configured and disposed to orient said flame detection device with respect to a flame at said output end of said burner;

said flame detection device being elongated and having a device axis along the length thereof;

said flame detection device being mounted in said mounting bracket such that said device axis of said flame detection device is essentially perpendicular to said angled wall of said mounting bracket and at an acute angle to the central longitudinal axis of said burner housing;

said burner housing comprising an opening therein in the form of an elongated slot;

said opening being configured and disposed to permit said flame detection device to be disposed at said angle to the central longitudinal axis of said burner housing and to detect a flame at said output end of said burner;

said flame detection device being disposed in said mounting bracket such that all of said flame detection device is disposed outside of said burner housing;

said flame detection device comprising a first end portion and a second end portion, wherein said first end portion is disposed further away from said burner housing than said second end portion;

said second end portion comprising a flame detector component disposed to face a flame at said output end of said burner;

said second end portion being disposed at said elongated slot such that all of said flame detector component is disposed outside of said burner housing; and said angled wall of said mounting bracket comprising an opening therein configured to permit partial insertion of said flame detection device inside said mounting bracket, such that said second end portion is disposed inside of said mounting bracket and said first end portion is disposed outside of said mounting bracket.

5. The pizza oven according to claim 4, wherein:

said mounting bracket is box-shaped with an open end;

said mounting bracket is configured and disposed to cover said elongated slot in said burner housing; and said elongated slot and said mounting bracket are disposed at a middle portion of said burner housing along the length of said burner housing.

6. The pizza oven according to claim 5, wherein said angle at which said device axis is disposed with respect to the central longitudinal axis of said burner housing is one of (A) and (B):

(A) in the range of fifteen degrees to thirty-five degrees; and (B) in the range of twenty-five degrees to thirty degrees.

7. A pizza oven heater comprising:

a burner configured to heat air to cook pizzas moved on a pizza conveyor;

a blower motor and a fan configured to assist in circulating air through a pizza baking chamber;

said burner comprising an elongated burner housing with a central longitudinal axis;

said burner comprising a gas tube disposed within said burner housing;

said gas tube comprising an input end and an output end;

said gas tube being configured to receive combustible gas in said input end;

said gas tube being configured to guide combustible gas therethrough to said output end;

said burner comprising an ignition device disposed at said output end of said burner;

said ignition device being configured to ignite combustible gas flowing out of said gas tube to create a flame at said output end of said burner;

said burner comprising a flame detection device;

said flame detection device having a device axis along the length thereof;

said burner comprising a mounting structure;

said flame detection device being supported by said mounting structure to dispose said device axis at an acute angle to the central longitudinal axis of said burner housing;

said burner housing comprising an opening therein;

said opening being configured and disposed to permit said flame detection device to be disposed at said angle to the central longitudinal axis of said burner housing and to detect a flame at said output end of said burner;

said mounting structure comprising a mounting bracket mounted on an outside surface of said burner housing;

said mounting bracket comprising an angled wall disposed at an angle with respect to the central longitudinal axis of said burner housing;

said flame detection device being mounted in said mounting bracket such that said device axis of said flame detection device is essentially perpendicular to said angled wall of said mounting bracket; and said angled wall comprising an opening therein configured to permit partial insertion of said flame detection device inside said mounting bracket, such that said second end portion is disposed inside of said mounting bracket and said first end portion is disposed outside of said mounting bracket.

8. The pizza oven heater according to claim 7, wherein:

said mounting bracket is box-shaped with an open end;

said mounting bracket is configured and disposed to cover said elongated slot in said burner housing; and said elongated slot and said mounting bracket are disposed at a middle portion of said burner housing along the length of said burner housing.

* * * * *